United States Patent
Raghavan et al.

(10) Patent No.: US 11,533,727 B1
(45) Date of Patent: Dec. 20, 2022

(54) MAXIMUM PERMISSIBLE EXPOSURE AND GRATING LOBES IN ULTRA WIDE BANDWIDTH OPERATIONS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/332,686

(22) Filed: May 27, 2021

(51) Int. Cl.
*H04W 72/04* (2009.01)
*H04L 5/00* (2006.01)

(52) U.S. Cl.
CPC ......... *H04W 72/0473* (2013.01); *H04L 5/001* (2013.01); *H04W 72/048* (2013.01); *H04W 72/0413* (2013.01); *H04W 72/0453* (2013.01)

(58) Field of Classification Search
CPC .................. H04W 72/048; H04W 72/0453
USPC ......................................................... 370/329
See application file for complete search history.

(56) References Cited

U.S. PATENT DOCUMENTS

| | | | |
|---|---|---|---|
| 2011/0158190 A1* | 6/2011 | Kuwahara | H04L 5/0062 370/329 |
| 2019/0141692 A1 | 5/2019 | Subramanian et al. | |
| 2020/0112926 A1 | 4/2020 | Laghate et al. | |

OTHER PUBLICATIONS

Ericsson: "Enhancements on Multi-beam Operation", R1-2102954, 3GPP TSG-RAN WG1 Meeting #104bis-e, 3rd Generation Partnership Project (3GPP), Mobile Competence Centre; 650, Route Des Lucioles, F-06921 Sophia-Antipolis Cedex, France, vol. RAN WG1, No. Online, Apr. 12, 2021-Apr. 20, 2021, Apr. 6, 2021, XP051993323, pp. 1-27.

International Search Report and Written Opinion—PCT/US2022/027480—ISA/EPO—dated Aug. 11, 2022.

* cited by examiner

*Primary Examiner* — Angel T Brockman
(74) *Attorney, Agent, or Firm* — Holland & Hart LLP

(57) ABSTRACT

Methods, systems, and devices for wireless communications are described. Generally, a user equipment (UE) may indicate one or more uplink beams that the UE is capable of generating where grating and main lobes of the one or more uplink beams satisfy a permissible exposure constraint. The UE may operate in an intra-band or inter-band carrier aggregation (CA) mode, and the UE may indicate an uplink beam per band of the CA mode that the UE is capable of generating to satisfy the permissible exposure constraint. Frequency dependent beam training may be initiated by the base station to support intra-band CA modes and inter-band CA modes. The base station may indicate a frequency band and uplink beam to the UE, and the UE may indicate one or more parameter values that the UE may use to generate the uplink beam in the band that satisfies the permissible exposure constraints.

30 Claims, 19 Drawing Sheets

MAXIMUM PERMISSIBLE EXPOSURE AND GRATING LOBES IN ULTRA WIDE BANDWIDTH OPERATIONS

FIELD OF TECHNOLOGY

The following relates to wireless communications, including maximum permissible exposure (MPE) and grating lobes in wide bandwidth operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, one or more UEs may communicate with one or more base stations using directional beams. Generation of directional beams may result in a primary or main lobe (e.g., in the direction of the beam) and a grating lobe in another direction. In some examples, UEs may be subject to one or more constraints regarding the effects of the grating lobes.

SUMMARY

The described techniques relate to improved methods, systems, devices, and apparatuses that support exposure constraints (e.g., maximum permissible exposure (MPE)) and grating lobes in wide bandwidth operations. Generally, a user equipment (UE) and a base station may exchange signaling indicating an uplink beam for use in a frequency band where the UE is capable of generating a main lobe and a grating lobe of the uplink beam that each satisfy an exposure constraint (e.g., a MPE constraint) in wide bandwidth operations (e.g., ultra-wide bandwidth operations). In some examples, the UE may indicate one or more uplink beams that the UE is capable of generating where grating and main lobes of the one or more uplink beams satisfy the MPE constraint. In some examples, the UE may operate in an intra-band or inter-band carrier aggregation (CA) mode, and the UE may indicate an uplink beam per band of the CA mode that the UE is capable of generating where grating and main lobes of the one or more uplink beams satisfy the MPE constraint (e.g., the UE may indicate at least one beam for each band or carrier of a CA configuration). In some examples, carrier frequency dependent beam training may be initiated by the base station to support one or more intra-band CA modes and one or more inter-band CA modes. The UE may perform beam refinement procedures to identify one or more MPE compliant uplink beams for each band. In some examples, the base station may indicate a frequency band and uplink beam to the UE, and the UE may transmit an indication of one or more parameter values that the UE may use to generate the uplink beam in the band that satisfies the MPE constraint. The parameter values may include carrier frequency or bandwidth part (BWP) dependent values for an MPE threshold, an MPE prohibit timer, a power backoff, or the like.

A method for wireless communications at a user equipment (UE) is described. The method may include receiving, from a base station, a report request message prompting the UE to report an uplink beam for a frequency band, transmitting, to the base station, a report indicating a first uplink beam for which the UE is capable of generating a main lobe and a grating lobe of the first uplink beam that each satisfy a permissible exposure constraint for the frequency band, receiving, from the base station, a control message scheduling the UE to transmit an uplink message within the frequency band, and transmitting the uplink message within the frequency band using the first uplink beam.

An apparatus for wireless communications at a UE is described. The apparatus may include a processor, memory coupled with the processor, and instructions stored in the memory. The instructions may be executable by the processor to cause the apparatus to receive, from a base station, a report request message prompting the UE to report an uplink beam for a frequency band, transmit, to the base station, a report indicating a first uplink beam for which the UE is capable of generating a main lobe and a grating lobe of the first uplink beam that each satisfy a permissible exposure constraint for the frequency band, receive, from the base station, a control message scheduling the UE to transmit an uplink message within the frequency band, and transmit the uplink message within the frequency band using the first uplink beam.

Another apparatus for wireless communications at a UE is described. The apparatus may include means for receiving, from a base station, a report request message prompting the UE to report an uplink beam for a frequency band, means for transmitting, to the base station, a report indicating a first uplink beam for which the UE is capable of generating a main lobe and a grating lobe of the first uplink beam that each satisfy a permissible exposure constraint for the frequency band, means for receiving, from the base station, a control message scheduling the UE to transmit an uplink message within the frequency band, and means for transmitting the uplink message within the frequency band using the first uplink beam.

A non-transitory computer-readable medium storing code for wireless communications at a UE is described. The code may include instructions executable by a processor to receive, from a base station, a report request message prompting the UE to report an uplink beam for a frequency band, transmit, to the base station, a report indicating a first uplink beam for which the UE is capable of generating a main lobe and a grating lobe of the first uplink beam that each satisfy a permissible exposure constraint for the frequency band, receive, from the base station, a control message scheduling the UE to transmit an uplink message within the frequency band, and transmit the uplink message within the frequency band using the first uplink beam.

In some examples of the method, apparatuses, and non-transitory computer-readable medium described herein, transmitting the report may include operations, features, means, or instructions for transmitting the report indicating the first uplink beam from a set of available uplink beams based on a magnitude of the grating lobe of the first uplink beam satisfying the permissible exposure constraint in a direction of the grating lobe that may be a function of the frequency band.

In some examples of the method, apparatuses, and non-transitory computer-readable medium described herein, transmitting the report may include operations, features, means, or instructions for transmitting the report indicating the first uplink beam from a set of available uplink beams based on a magnitude of the main lobe of the first uplink beam satisfying the permissible exposure constraint in a direction of the first uplink beam.

Some examples of the method, apparatuses, and non-transitory computer-readable medium described herein may further include operations, features, means, or instructions for receiving, from the base station, control signaling configuring the UE to operate in a carrier aggregation mode for a set of multiple frequency bands including the frequency band and transmitting the report indicating one or more uplink beams for which the UE may be capable of generating a respective main lobe and a respective grating lobe that each satisfy a permissible exposure constraint in a respective frequency band of the set of multiple frequency bands.

In some examples of the method, apparatuses, and non-transitory computer-readable medium described herein, transmitting the report may include operations, features, means, or instructions for transmitting the report indicating a second uplink beam for which the UE may be capable of generating a second main lobe and a second grating lobe of the second uplink beam that each satisfy a permissible exposure constraint for a second frequency band of the set of multiple frequency bands.

In some examples of the method, apparatuses, and non-transitory computer-readable medium described herein, transmitting the report may include operations, features, means, or instructions for transmitting the report indicating the first uplink beam for which the UE may be capable of generating the main lobe and the grating lobe of the first uplink beam that each satisfy a permissible exposure constraint for a second frequency band.

In some examples of the method, apparatuses, and non-transitory computer-readable medium described herein, transmitting the report may include operations, features, means, or instructions for transmitting, to the base station, the report indicating the first uplink beam for which the UE may be capable of generating the main lobe and the grating lobe of the first uplink beam that each satisfy a permissible exposure constraint for a subset of the set of multiple frequency bands.

Some examples of the method, apparatuses, and non-transitory computer-readable medium described herein may further include operations, features, means, or instructions for receiving, from the base station, control signaling initiating a beam refinement procedure for multiple frequency bands of the set of multiple frequency bands for the carrier aggregation mode and transmitting the report indicating one or more uplink beams for which the UE may be capable of generating a respective main lobe and a respective grating lobe that each satisfy a permissible exposure constraint in a respective frequency band of the multiple frequency bands based on the control signaling.

In some examples of the method, apparatuses, and non-transitory computer-readable medium described herein, the first uplink beam may be reciprocal to a downlink beam determined for the frequency band in the beam refinement procedure.

In some examples of the method, apparatuses, and non-transitory computer-readable medium described herein, the first uplink beam may be not reciprocal to a downlink beam determined for the frequency band in the beam refinement procedure.

In some examples of the method, apparatuses, and non-transitory computer-readable medium described herein, the carrier aggregation mode includes an inter-band carrier aggregation mode or an intra-band carrier aggregation mode.

In some examples of the method, apparatuses, and non-transitory computer-readable medium described herein, transmitting the report may include operations, features, means, or instructions for transmitting the report including a transmission configuration indicator state of the first uplink beam.

A method for wireless communications at a UE is described. The method may include receiving, from a base station, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band, transmitting, to the base station, a report indicating the one or more parameter values for the first uplink beam, receiving, from the base station based on the report, a control message scheduling the UE to transmit an uplink message within the frequency band, and transmitting, within the frequency band, the uplink message using the first uplink beam according to the one or more parameter values.

An apparatus for wireless communications at a UE is described. The apparatus may include a processor, memory coupled with the processor, and instructions stored in the memory. The instructions may be executable by the processor to cause the apparatus to receive, from a base station, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band, transmit, to the base station, a report indicating the one or more parameter values for the first uplink beam, receive, from the base station based on the report, a control message scheduling the UE to transmit an uplink message within the frequency band, and transmit, within the frequency band, the uplink message using the first uplink beam according to the one or more parameter values.

Another apparatus for wireless communications at a UE is described. The apparatus may include means for receiving, from a base station, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band, means for transmitting, to the base station, a report indicating the one or more parameter values for the first uplink beam, means for receiving, from the base station based on the report, a control message scheduling the UE to transmit an uplink message within the frequency band, and means for transmitting, within the frequency band, the uplink message using the first uplink beam according to the one or more parameter values.

A non-transitory computer-readable medium storing code for wireless communications at a UE is described. The code may include instructions executable by a processor to receive, from a base station, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band, transmit, to the base station, a report indicating the one or more parameter values for the first uplink beam, receive, from the base station based on the report, a control message scheduling the UE to transmit an uplink message within the frequency band, and transmit, within the frequency band, the uplink message using the first uplink beam according to the one or more parameter values.

Some examples of the method, apparatuses, and non-transitory computer-readable medium described herein may further include operations, features, means, or instructions for receiving the report request indicating a set of multiple uplink beams and transmitting the report indicating respective one or more parameter values for each uplink beam of the set of multiple uplink beams.

Some examples of the method, apparatuses, and non-transitory computer-readable medium described herein may further include operations, features, means, or instructions for receiving the report request message indicating a second frequency band, the report prompting the UE to report one or more second parameter values for the first uplink beam for which the UE may be capable of generating, using the one or more parameter values, a main lobe and a grating lobe of the first uplink beam that each satisfy a permissible exposure constraint for the second frequency band, transmitting, to the base station, the report indicating the one or more second parameter values for the first uplink beam, receiving, from the base station based on the report, the control message scheduling the UE to transmit a second uplink message within the second frequency band, and transmitting, within the second frequency band, the second uplink message using the first uplink beam according to the one or more second parameter values.

Some examples of the method, apparatuses, and non-transitory computer-readable medium described herein may further include operations, features, means, or instructions for receiving the report request message indicating a second uplink beam, the report prompting the UE to report one or more second parameter values for the second uplink beam for which the UE may be capable of generating, using the one or more parameter values, a main lobe and a grating lobe of the second uplink beam that each satisfy a permissible exposure constraint for the frequency band, transmitting, to the base station, the report indicating the one or more second parameter values for the second uplink beam, receiving, from the base station based on the report, the control message scheduling the UE to transmit a second uplink message within the frequency band, and transmitting, within the frequency band, the second uplink message using the second uplink beam according to the one or more second parameter values.

In some examples of the method, apparatuses, and non-transitory computer-readable medium described herein, receiving the report request message may include operations, features, means, or instructions for receiving the report request message indicating a transmission configuration state of the first uplink beam.

In some examples of the method, apparatuses, and non-transitory computer-readable medium described herein, transmitting the report may include operations, features, means, or instructions for transmitting the report indicating the one or more parameter values including a permissible exposure threshold, a permissible exposure timer, an indication of the frequency band, a power backoff value, or any combination thereof, for the first uplink beam.

A method for wireless communications at a base station is described. The method may include transmitting, to a UE, a report request message prompting the UE to report an uplink beam for a frequency band, receiving, from the UE, a report indicating a first uplink beam for which the UE is capable of generating a main lobe and a grating lobe of the first uplink beam that each satisfy a permissible exposure constraint for the frequency band, transmitting, to the UE, a control message scheduling the UE to transmit an uplink message within the frequency band, and receiving the uplink message within the frequency band using the first uplink beam.

An apparatus for wireless communications at a base station is described. The apparatus may include a processor, memory coupled with the processor, and instructions stored in the memory. The instructions may be executable by the processor to cause the apparatus to transmit, to a UE, a report request message prompting the UE to report an uplink beam for a frequency band, receive, from the UE, a report indicating a first uplink beam for which the UE is capable of generating a main lobe and a grating lobe of the first uplink beam that each satisfy a permissible exposure constraint for the frequency band, transmit, to the UE, a control message scheduling the UE to transmit an uplink message within the frequency band, and receive the uplink message within the frequency band using the first uplink beam.

Another apparatus for wireless communications at a base station is described. The apparatus may include means for transmitting, to a UE, a report request message prompting the UE to report an uplink beam for a frequency band, means for receiving, from the UE, a report indicating a first uplink beam for which the UE is capable of generating a main lobe and a grating lobe of the first uplink beam that each satisfy a permissible exposure constraint for the frequency band, means for transmitting, to the UE, a control message scheduling the UE to transmit an uplink message within the frequency band, and means for receiving the uplink message within the frequency band using the first uplink beam.

A non-transitory computer-readable medium storing code for wireless communications at a base station is described. The code may include instructions executable by a processor to transmit, to a UE, a report request message prompting the UE to report an uplink beam for a frequency band, receive, from the UE, a report indicating a first uplink beam for which the UE is capable of generating a main lobe and a grating lobe of the first uplink beam that each satisfy a permissible exposure constraint for the frequency band, transmit, to the UE, a control message scheduling the UE to transmit an uplink message within the frequency band, and receive the uplink message within the frequency band using the first uplink beam.

In some examples of the method, apparatuses, and non-transitory computer-readable medium described herein, receiving the report may include operations, features, means, or instructions for receiving the report indicating the first uplink beam from a set of available uplink beams based on a magnitude of the grating lobe of the first uplink beam satisfying the permissible exposure constraint in a direction of the grating lobe that may be a function of the frequency band.

In some examples of the method, apparatuses, and non-transitory computer-readable medium described herein, receiving the report may include operations, features, means, or instructions for receiving the report indicating the first uplink beam from a set of available uplink beams based on a magnitude of the main lobe of the first uplink beam satisfying the permissible exposure constraint in a direction of the first uplink beam.

Some examples of the method, apparatuses, and non-transitory computer-readable medium described herein may further include operations, features, means, or instructions for transmitting, to the UE, control signaling configuring the UE to operate in a carrier aggregation mode for a set of multiple frequency bands including the frequency band and receiving the report indicating one or more uplink beams for which the UE may be capable of generating a respective main lobe and a respective grating lobe that each satisfy a permissible exposure constraint in a respective frequency band of the set of multiple frequency bands.

In some examples of the method, apparatuses, and non-transitory computer-readable medium described herein, receiving the report may include operations, features, means, or instructions for receiving the report indicating a second uplink beam for which the UE may be capable of generating a second main lobe and a second grating lobe of the second uplink beam that each satisfy a permissible exposure constraint for a second frequency band of the set of multiple frequency bands.

In some examples of the method, apparatuses, and non-transitory computer-readable medium described herein, receiving the report may include operations, features, means, or instructions for receiving the report indicating the first uplink beam for which the UE may be capable of generating the main lobe and the grating lobe of the first uplink beam that each satisfy a permissible exposure constraint for a second frequency band.

In some examples of the method, apparatuses, and non-transitory computer-readable medium described herein, receiving the report may include operations, features, means, or instructions for receiving the report indicating the first uplink beam for which the UE may be capable of generating the main lobe and the grating lobe of the first uplink beam that each satisfy a permissible exposure constraint for a subset of the set of multiple frequency bands.

Some examples of the method, apparatuses, and non-transitory computer-readable medium described herein may further include operations, features, means, or instructions for transmitting, to the UE, control signaling initiating a beam refinement procedure for multiple frequency bands of the set of multiple frequency bands for the carrier aggregation mode and receiving the report indicating one or more uplink beams for which the UE may be capable of generating a respective main lobe and a respective grating lobe that each satisfy a permissible exposure constraint in a respective frequency band of the multiple frequency bands based on the control signaling.

A method for wireless communications at a base station is described. The method may include transmitting, to a UE, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band, receiving, from the UE, a report indicating the one or more parameter values for the first uplink beam, transmitting, to the UE based on the report, a control message scheduling the UE to transmit an uplink message within the frequency band, and receiving, within the frequency band, the uplink message using the first uplink beam according to the one or more parameter values.

An apparatus for wireless communications at a base station is described. The apparatus may include a processor, memory coupled with the processor, and instructions stored in the memory. The instructions may be executable by the processor to cause the apparatus to transmit, to a UE, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band, receive, from the UE, a report indicating the one or more parameter values for the first uplink beam, transmit, to the UE based on the report, a control message scheduling the UE to transmit an uplink message within the frequency band, and receive, within the frequency band, the uplink message using the first uplink beam according to the one or more parameter values.

Another apparatus for wireless communications at a base station is described. The apparatus may include means for transmitting, to a UE, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band, means for receiving, from the UE, a report indicating the one or more parameter values for the first uplink beam, means for transmitting, to the UE based on the report, a control message scheduling the UE to transmit an uplink message within the frequency band, and means for receiving, within the frequency band, the uplink message using the first uplink beam according to the one or more parameter values.

A non-transitory computer-readable medium storing code for wireless communications at a base station is described. The code may include instructions executable by a processor to transmit, to a UE, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band, receive, from the UE, a report indicating the one or more parameter values for the first uplink beam, transmit, to the UE based on the report, a control message scheduling the UE to transmit an uplink message within the frequency band, and receive, within the frequency band, the uplink message using the first uplink beam according to the one or more parameter values.

Some examples of the method, apparatuses, and non-transitory computer-readable medium described herein may further include operations, features, means, or instructions for transmitting the report request indicating a set of multiple uplink beams and receiving the report indicating the one or more parameter values for each uplink beam of the set of multiple uplink beams.

Some examples of the method, apparatuses, and non-transitory computer-readable medium described herein may further include operations, features, means, or instructions for transmitting the report request message indicating a second frequency band, the report prompting the UE to report one or more second parameter values for the first uplink beam for which the UE may be capable of generating, using the one or more parameter values, a main lobe and a grating lobe of the first uplink beam that each satisfy a permissible exposure constraint for the second frequency band, receiving, from the UE, the report indicating the one or more second parameter values for the first uplink beam, transmitting, to the UE based on the report, the control message scheduling the UE to transmit a second uplink message within the second frequency band, and receiving, within the second frequency band, the second uplink message using the first uplink beam according to the one or more second parameter values.

Some examples of the method, apparatuses, and non-transitory computer-readable medium described herein may further include operations, features, means, or instructions for transmitting the report request message indicating a second uplink beam, the report prompting the UE to report one or more second parameter values for the second uplink beam for which the UE may be capable of generating, using the one or more parameter values, a main lobe and a grating lobe of the second uplink beam that each satisfy a permissible exposure constraint for the frequency band, receiving, from the UE, the report indicating the one or more second parameter values for the second uplink beam, transmitting, to the UE based on the report, the control message scheduling the UE to transmit a second uplink message within the frequency band, and receiving, within the frequency band, the second uplink message using the second uplink beam according to the one or more second parameter values.

DETAILED DESCRIPTION

Figure 1:
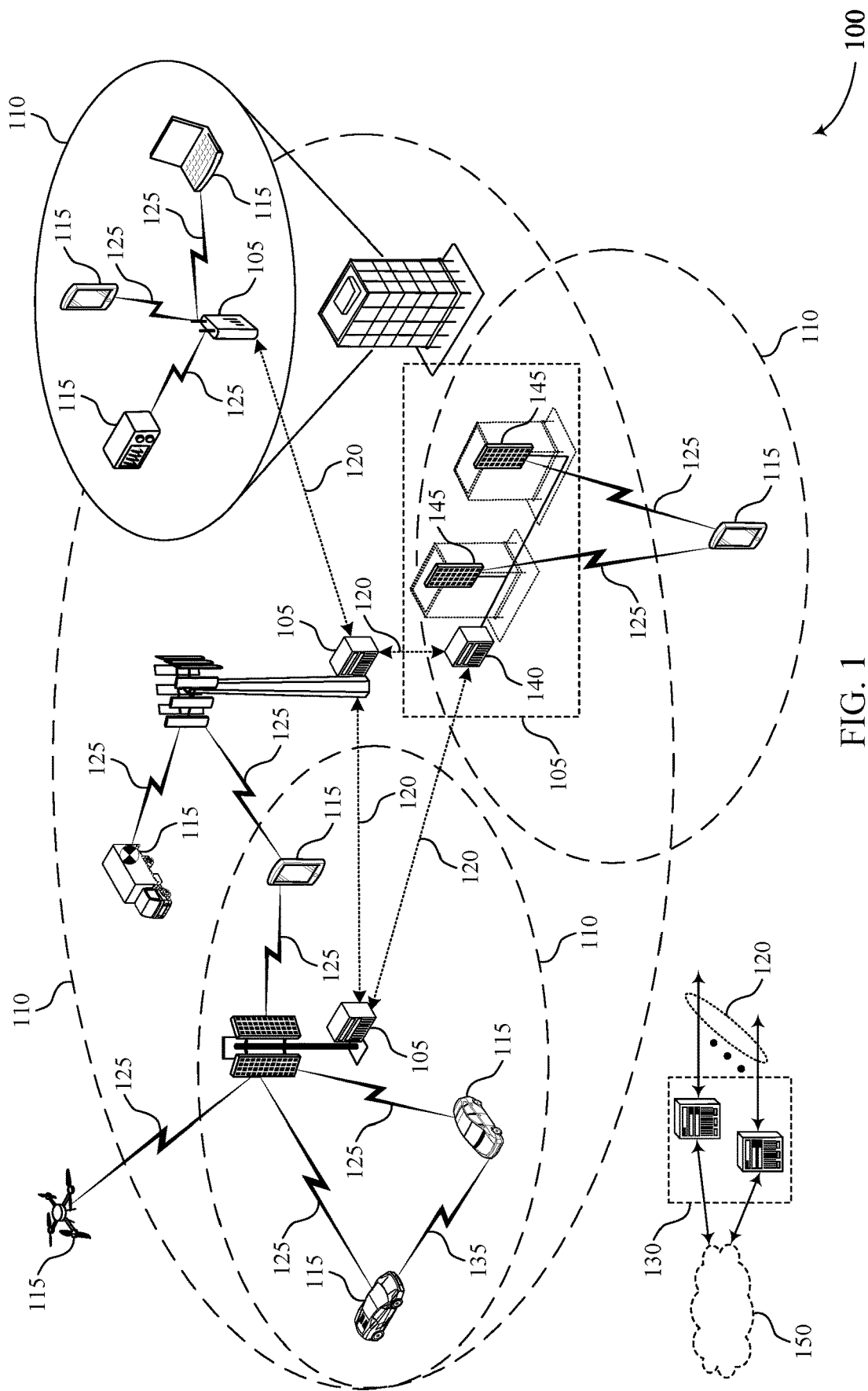
FIG. 1 illustrates an example of a wireless communications system that supports permissible exposure and grating lobes in wide bandwidth operations in accordance with aspects of the present disclosure.

Some wireless communications systems may support wireless communications using one or more directional beams. A transmitting device (e.g., a user equipment (UE)) may utilize one or more antenna elements to generate a beam in a desired direction. The transmitting UE may generate a beam having a main lobe directed toward a receiving device (e.g., a base station), and one or more additional side lobes pointed in other directions. The direction and magnitude of the main lobe, the side lobes, or both, may be dependent on the configuration of the one or more antennas (e.g., based on a spacing between antenna elements of an antenna array).

A wireless communications system may support wideband communications (e.g., ultra-wideband communications on an ultra-wideband channel), including communications on upper millimeter bands (e.g., frequency range 4 (FR4)). Transmitting UEs utilizing fixed inter-antenna element spacing in wide bandwidths may generate beamformed transmissions. Because of the higher frequencies available in upper millimeter bands, more antenna elements may be available in a same physical aperture, resulting in larger antenna arrays. However, because of the decreased distance between antenna elements, the UE may generate a beam having a main lobe and one or more grating lobes. A grating lobe may be defined as a lobe having an output power that is nearly as high (e.g., satisfying a threshold difference) as the power of the main lobe of the generated beam. In some examples, a grating lobe may exceed an MPE constraint imposed by the Federal Communications Commission (FCC) or International Commission on Non-Ionizing Radiation Protection (ICNIRP), and uplink communications using beams associated with such grating lobes potentially may exceed the MPE constraint. Thus, although a particular uplink beam may be a preferred or best beam, it may not be permitted if the grating lobe violates the MPE constraint.

In some conventional systems, a UE may perform a beam refinement procedure with a base station, and may indicate a preferred downlink beam. The UE may select uplink beams for communication with the base station based on beam reciprocity (e.g., a preferred downlink beam may correspond to a matching uplink beam). However, in cases where the UE is configured to communicate on a wide band, the reciprocal uplink beam may not be available if it violates the MPE constraint. A UE may need to identify and communicate uplink beams (e.g., that may or may not be reciprocal to preferred downlink beams) so that they still satisfy the MPE constraints.

Techniques are described for signaling an uplink beam for use in a frequency band where the UE is capable of generating a main lobe and a grating lobe of an uplink beam that each satisfy a MPE constraint. In some examples, the UE may indicate one or more uplink beams that the UE is capable of generating where the grating and main lobes of the one or more uplink beams satisfy the MPE constraint. In some examples, the UE may operate in an intra-band or inter-band carrier aggregation (CA) mode, and the UE may indicate an uplink beam per band that the UE is capable of generating where grating and main lobes of the one or more uplink beams satisfy the MPE constraint (e.g., the UE may indicate at least one beam for each band or carrier of a CA configuration). In some examples, carrier frequency dependent beam training may be initiated by the base station to support intra-band CA modes and inter-band CA modes. The UE may perform beam refinement procedures to identify one or more MPE compliant uplink beams for each band.

In some examples, the base station may indicate a frequency band and uplink beam to the UE, and the UE may transmit an indication of one or more parameter values that the UE may use to generate the uplink beam in the band that satisfies the MPE constraints. The parameter values may include carrier frequency or BWP dependent values for a MPE threshold, a MPE prohibit timer, or the like).

Based on information provided by the UE (e.g., an MPE compliant beam or an indication of parameter values the UE could use to generate an MPE compliant beam in a particular frequency band), the base station may schedule uplink transmissions, and the UE may send the uplink transmissions on the indicated beam and/or according to the indicated parameters.

Aspects of the disclosure are initially described in the context of wireless communications systems. Aspects of the disclosure are further illustrated by and described with reference to systems, beam configuration schemes, wireless communications systems, and process flows. Aspects of the disclosure are further illustrated by and described with reference to apparatus diagrams, system diagrams, and flowcharts that relate to permissible exposure and grating lobes in wide bandwidth operations.

FIG. 1 illustrates an example of a wireless communications system 100 that supports permissible exposure and grating lobes in wide bandwidth operations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic coverage area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic coverage area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic coverage area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Generally, a UE 115 and a base station 105 may exchange signaling indicating an uplink beam for use in a frequency band where the UE 115 is capable of generating a main lobe and a grating lobe of an uplink beam that each satisfy a permissible exposure constraint (e.g., a maximum permissible exposure (MPE) constraint). In some examples, the UE 115 may indicate one or more uplink beams that the UE 115 is capable of generating where grating and main lobes of the one or more uplink beams satisfy the permissible exposure constraint. In some examples, the UE 115 may operate in an intra-band or inter-band carrier aggregation (CA) mode, and the UE 115 may indicate an uplink beam per band that the UE 115 is capable of generating where grating and main lobes of the one or more uplink beams satisfy the permissible exposure constraint (e.g., the UE 115 may indicate at least one beam for each band or carrier of a CA configuration). In some examples, carrier frequency dependent beam training may be initiated by the base station to support intra-band CA modes and inter-band CA modes. The UE 115 may perform beam refinement procedures to identify permissible exposure compliant uplink beams for each band. In some examples, the base station may indicate a frequency band and uplink beam to the UE 115, and the UE 115 may transmit an indication of one or more parameter values that the UE may use to generate the uplink beam in the band that satisfies the permissible exposure constraints. The parameter values may include carrier frequency or BWP dependent values for an MPE threshold, an MPE prohibit timer, or the like). Although described herein with reference to the MPE, techniques described herein may be applied to any permissive exposure constraints (e.g., with reference to temporal exposure, power exposure, or the like).

Figure 2:
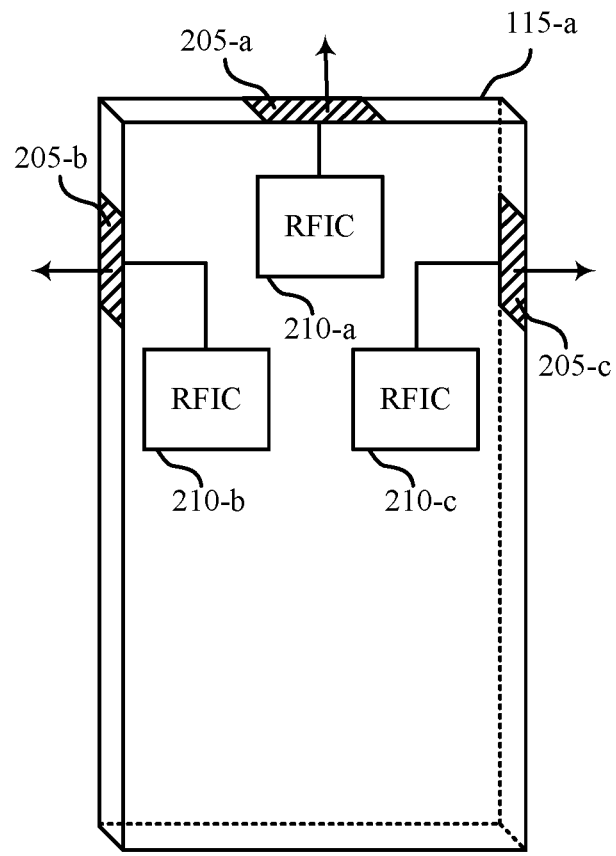
FIG. 2 illustrates an example of a system that supports permissible exposure and grating lobes in wide bandwidth operations in accordance with aspects of the present disclosure.

FIG. 2 illustrates an example of a system 200 for wireless communications that supports that supports permissible exposure and grating lobes in wide bandwidth operations in accordance with aspects of the present disclosure. In some examples, system 200 may implement aspects of wireless communication system 100. As shown, system 200 includes UE 115-$a$, which may be an example of any one of UEs 115 described with reference to FIG. 1.

In the illustrated example, UE 115-$a$ may include multiple antenna modules (e.g., first antenna module 205-$a$, second antenna module 205-$b$, and third antenna module 205-$c$). In some cases, each antenna module 205 in UE 115-$a$ may be connected to and controlled by an independent radio frequency integrated circuit (RFIC). For instance, first antenna module 205-$a$ may be connected to and controlled by first RFIC 210-$a$, second antenna module 205-$b$ may be connected to and controlled by second RFIC 210-$b$, and third antenna module 205-$c$ may be connected to and controlled by third RFIC 210-$c$. In some cases, each antenna module may be configured to establish a communication link in a certain direction. For example, first antenna module 205-$a$ may establish a communication link in a first direction, second antenna module 205-$b$ may establish a communication link in a second direction different from the first direction, and third antenna module 205-$c$ may establish a communication link in a third direction different from the first direction and the second direction, etc.

In some cases, the antenna modules 205 of UE 115-$a$ may be configured to operate in certain frequency ranges (e.g., frequency range 2 (FR2) at 28 GHz or 39 GHz), frequency bands above 24 GHz). In some examples, one or more antenna modules 205 of UE 115-$a$ may support communications in higher frequency ranges (e.g., frequency range 4 (FR4), 52.6 GHz to 114.25 GHz bands) which may be referred to as upper millimeter wave bands, sub THz regime, or the like. Because wavelengths ($\lambda$) are smaller in higher frequency bands (e.g., FR4) than lower frequency bands (e.g., FR2), more antenna elements may be located in the same physical aperture in FR4 than in FR2 (e.g., resulting in larger antenna arrays). Larger antenna arrays and more antenna elements may result in more efficient communications, increased throughput, or the like. Some UEs 115-$a$ may be capable of wireless communications at even higher frequency ranges than FR4.

In some examples (e.g., where the UE 115-$a$ supports wireless communications in frequency ranges between 52.6 GHz and 71 GHz), a wide bandwidth channel (e.g., 14 GHz from 57 GHz to 71 GHz) may be available across multiple geographies, which may result in significant performance enhancement and beamforming gains. Some devices (e.g., UE 115-$a$) may support a single RF chain for use over the wide bandwidth range (e.g., the 14 GHz channel). The single RF chain may use a single set of phase shifters, and analog or radio frequency beamforming may be constrained. This may result in poor performance at certain frequencies. Thus, UE 115-$a$ may switch from one frequency range (e.g., one frequency carrier, bandwidth part (BWP), band, or the like) to another.

UE 115-$a$ may perform switching operations from one carrier frequency to another carrier frequency (e.g., or from one band to another in an intra-band carrier aggregation (CA) mode or an inter-band CA mode). UE 115-$a$ may perform wireless communications using antenna modules 205. Due to the use of fixed inter-antenna element spacings and coverage of wide bandwidths, UE 115-$a$ may generate directional beams that result in main lobes (e.g., peak direction of the beam) and one or more side lobes. One of the side lobes may be a grating lobe, which may be defined as a lobe that has a similar power (e.g., within a threshold) as the main lobe of the beam, as described in greater detail with reference to FIG. 4. In some examples, as described in greater detail with reference to FIG. 3, grating robes of certain magnitudes may violate one or more permissible exposure constraints or requirements.

UE 115-$a$ may be constrained by one or more permissible exposure requirements (e.g., MPE constraints), defining threshold amounts of thermal or power exposures to which a user is permitted to be exposed without health risks. In some examples, grating lobes resulting from beams in wide bandwidth frequencies may not satisfy the permissible exposure constraints. In some examples, as described in greater detail with reference to FIGS. 5-7, UE 115-a may determine permissible exposure limitations for grating lobes, and may select and indicate uplink beams that satisfy such permissible exposure limitations.

Figure 3:
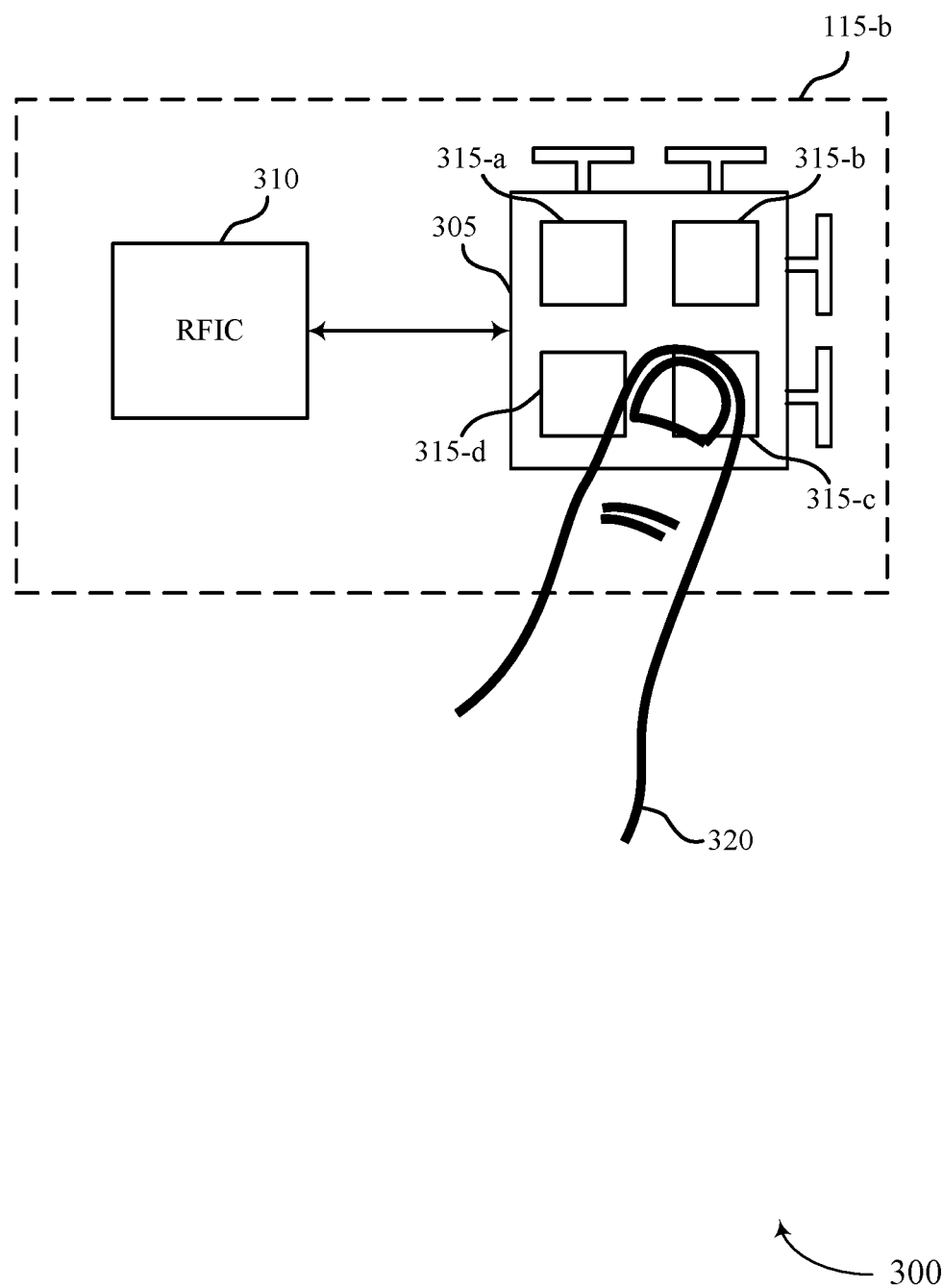
FIG. 3 illustrates an example of a system that supports permissible exposure and grating lobes in wide bandwidth operations in accordance with aspects of the present disclosure.

FIG. 3 illustrates an example of a system 300 for wireless communications that supports permissible exposure and grating lobes in wide bandwidth operations in accordance with aspects of the present disclosure. In some examples, system 300 may implement aspects of wireless communication system 100. For instance, system 300 includes UE 115-b, which may be an example of any one of UEs 115 from FIG. 1 or FIG. 2.

In some examples, UE 115-b may include one or more antenna modules. In some cases, UE 115-b may include at least two antenna modules. As shown, UE 115-b may include antenna module 305 that connects to RFIC. As shown, antenna module 305 may include at least one antenna (e.g., antennas 315). In some cases, antennas 315 may include a patch antenna. In some examples, antenna module 305 may include an array of antennas (e.g., 1×2 sub-array of antennas, 2×2 sub-array of antennas, 2×3 sub-array of antennas, etc.). In the illustrated example, antenna module 305 includes a 2×2 sub-array of antennas that includes antennas 315.

In some cases, UE 115-b may use an RF chain with RFIC 310 and at least one of antennas 315 from antenna module 305 in conjunction with a first communication link. In some cases, UE 115-b may switch between antennas 315 for the first communication link. For example, UE 115-b may use antenna 315-a, then switch to antenna 315-b, then switch to antenna 315-c, then switch to antenna 315-d, then switch back to antenna 315-a, and so forth. In some cases, UE 115-b may use antenna 315-a and antenna 315-b and then switch to antenna 315-c and antenna 315-d, and then switch back to antenna 315-a and antenna 315-b, and so on. In some cases, UE 115-b may switch an RF chain to a second RFIC (different from RFIC 310) and at least one of antenna from a different antenna module (different from antenna module 305) in conjunction with establishing a second communication link and sending/receiving data over the second communication link. In some cases, UE 115-b may switch the RF chain back to RFIC 310 and antenna module 305 to reestablish the first communication link and return to sending/receiving data over the first communication link.

In some cases, UE 115-b may generate one or more directional beams for communicating with another device (e.g., another UE 115 or a base station 105). Antennas 315 may be located at a fixed distance from each other. Based on the fixed distance (e.g., if UE 115-b is operating in a wide bandwidth in high frequency ranges (e.g., FR4), some uplink beams generated using antennas 315 may result in a grating lobe, as described in greater detail with reference to FIG. 4. However, UE 115-b may be subject to one or more constraints (e.g., an MPE constraint imposed by the FCC, International Commission on Non-Ionizing Radiation Protection (ICNIRP), or the like). Such constraints may be specified in terms of either short-/medium-term temporal averaging, or local-/medium-spatial averaging of radiated power. These constraints could correspond to different regulatory requirements across different geographies. In some cases, the thermal and exposure constraints may satisfy health and safety standards as well as reduce electromagnetic pollution or noise/interference from transmissions made by UE 115-b.

In some examples, a head or limb of a user (e.g., finger, thumb, arm, leg, torso) or another part of the user may be situated adjacent to antenna module 305. As shown, a finger 320 of a user of UE 115-b may be adjacent to antenna module 305. In some cases, UE 115-b may detect the presence of finger 320 adjacent to antenna module 305. In some cases, UE 115-b may detect a distance between antenna module 305 and finger 320. In some cases, UE 115-b may use a near-field or beyond near-field approach to detect finger 320. In some cases, UE 115-b may transmit detection signals over unused UL resources to ensure that there is none to negligible UL interference to the associated network. In a conventional system, UE 115-b may transmit MPE compliant UL power based on the detected presence of or the detected distance to finger 320. One problem with the conventional system is that transmitting MPE complete UL power may lead to a reduction in quality of service as transmit power or EIRP is reduced.

In some examples, uplink transmission power backoff procedures may be based on the use of a single beam pattern peak in beam properties. However, as illustrated with reference to FIG. 4, generating beams in some cases (e.g., in some frequencies) may result in a main lobe and a grating lobe. The grating lobe may not satisfy one or more MPE constraints. For instance, a grating lobe may be directed toward finger 320, resulting in higher than permissible power for user safety under MPE constraints. In some examples, as described in greater detail with reference to FIGS. 5-7, UE 115-a may determine one or more uplink beams that satisfy MPE constraints, or may indicate one or more parameter values to a base station 105 for which UE 115-b is able to satisfy MPE constraints on a particular beam. The UE may use such indicated beams for uplink communications.

Figure 4:
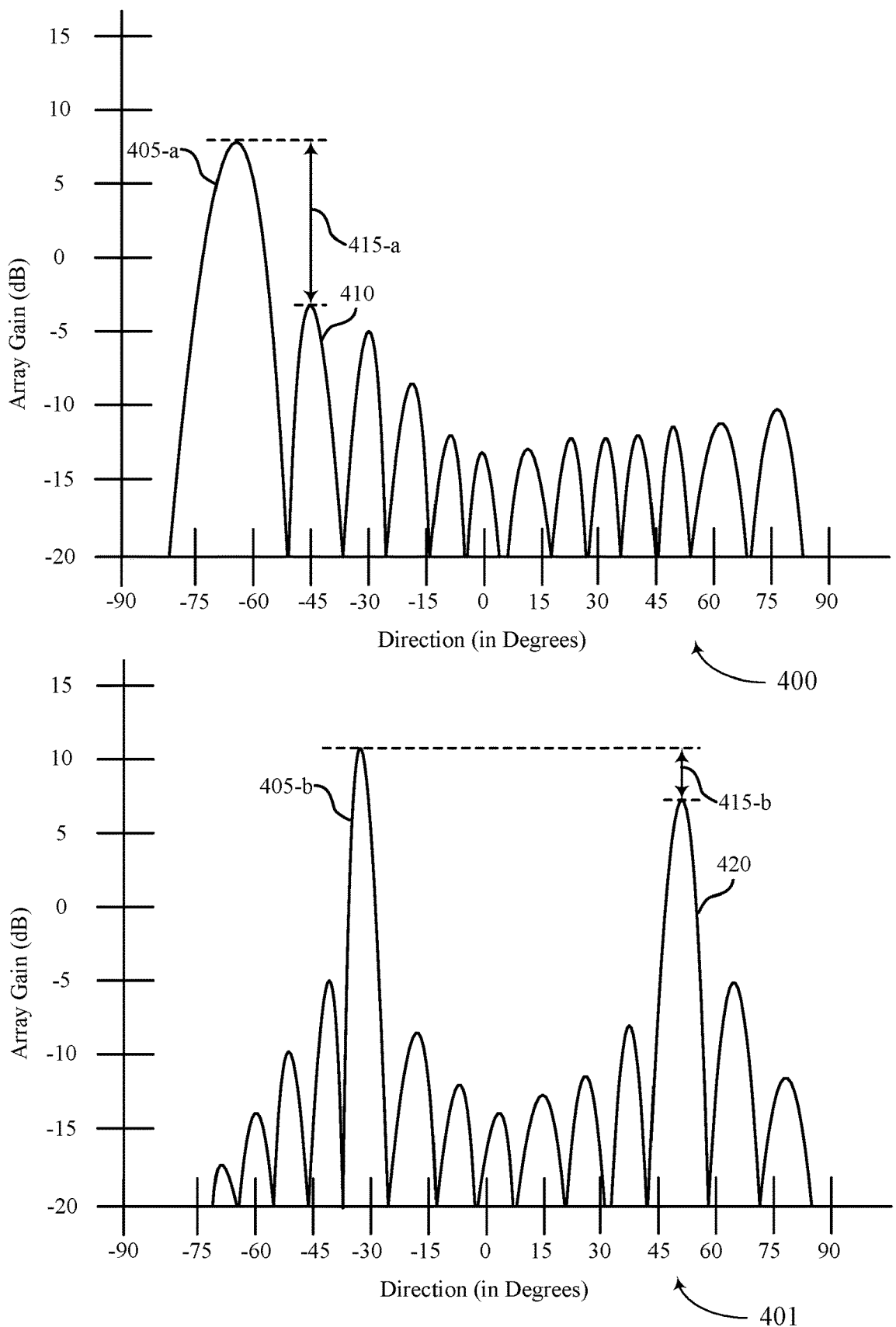
FIG. 4 illustrates an example of a beam configuration scheme that supports permissible exposure and grating lobes in wide bandwidth operations in accordance with aspects of the present disclosure.

FIG. 4 illustrates an example of a first beam configuration scheme 401 and a second beam configuration scheme 402 that support permissible exposure and grating lobes in wide bandwidth operations in accordance with aspects of the present disclosure. Beam configuration scheme 400 may be performed by or incorporate aspects of one or more wireless devices, such as UEs or base stations, which may be examples of corresponding devices described with reference to FIGS. 1-3.

As described with reference to FIG. 3, a UE (e.g., a UE 115-a or a UE 115-b) may support mmW communications over an ultrawide bandwidth over an ultrawide bandwidth. Additionally, the UE may support directional communications over the ultrawide bandwidth using beamforming techniques. In some cases, beamforming over the ultrawide bandwidth may create grating lobes. For example, the UE may each include a radio frequency chain (e.g., an antenna array and associated radio frequency circuitry such as analog to digital converters, digital to analog converters, mixers, or downconverters, among other radio frequency circuitry) that is optimized for a particular frequency of the ultrawide bandwidth. For example, an inter-antenna element spacing of a respective antenna array may be fixed and tuned for communicating at the particular frequency. In some examples, communicating (e.g., operating) at some frequencies of the ultrawide bandwidth different from the particular frequency may create one or more grating lobes of a directional beam in addition to a main lobe of the directional beam.

Characteristics of grating lobes and main lobes of directional beams may be determined based on various parameters. For example, directions and gains corresponding to a grating lobe and a main lobe of a directional beam may be determined based on operating frequency, the inter-antenna element spacing, a geometry of the antenna array (e.g., a quantity of antenna elements of the antenna array, a geometrical structure of the antenna array such as a linear structure or a planar structure), an elemental gain pattern associated with the antenna elements (e.g., an elemental gain pattern of a representative antenna of the antenna array), a peak elemental gain of the representative antenna element, or a combination thereof, among other parameters.

For example, in some cases, a peak gain direction θ of a main lobe of a directional beam nominally steered at some angle $\theta_o$ may be determined by:

$$\theta = \sin^{-1}(\sin(\theta_o)/x) \quad (1)$$

where $x=2d/\lambda$, d is the inter-antenna element spacing of the antenna array, and λ is the operating wavelength. In some examples, peak gain directions φ of grating lobes of a directional beam may be determined within a coverage region of the directional beam by:

$$\phi = \sin^{-1}([\sin(\theta_o) - 2n]/x) \quad (2)$$

where n is some non-zero integer. Because the inter-antenna element spacing d of the antenna array is fixed (e.g., based on, for example, a hardware configuration), the operating wavelength λ and beam steering angle $\theta_o$ may determine whether grating lobes are created. In some examples, one or more grating lobes may be created for any $\theta_o$ if λ is such that d≥λ. In some cases, no grating lobes may be created for any $\theta_o$ if λ is such that d≤λ/2. In some examples, if λ is such that λ/2≤d≤λ, some $\theta_o$ may create one or more grating lobes (e.g., $\theta_o$ towards the edge of the coverage region of the antenna array such as the end-fire directions and their neighborhood).

As illustrated with reference to beam configuration scheme 400, an uplink beam may not result in a grating lobe. For example, the UE may steer the beam toward θ=−60 degrees, and where d=λ/2. Thus, the uplink beam may result in a main lobe 405-a pointed in the direction of θ=−60 degrees, and one or more side lobes 410. For example, a next side lobe 410 pointed in the direction of θ=−45 degrees and having a next highest array gain may have a gain differential 415-a between the main lobe 405-a and side lobe 410. The gain differential 415-a may be large (e.g., may exceed a threshold difference), and side lobe 410 may not be defined as a grating lobe (e.g., may not have a power output that is too close to the power of main lobe 405-a). In some cases, the size of gain differential 415-a may be such that the uplink beam resulting in main lobe 405-a and side lobe 410 satisfies one or more permissible exposure constraints.

As illustrated with reference to beam configuration scheme 401, an uplink beam may result in a grating lobe 420. For instance, the UE may steer the beam toward θ=−60 degrees, and where d=λ. As λ increases, the direction of a lobe may move. For example, the main lobe 405-b of such an uplink beam may be pointed toward θ=−30 degrees. The uplink beam may also generate one or more side lobes, including grating lobe 420. Grating lobe 420 may be pointed toward θ=45 degrees. In some examples, the gain differential 415-b between main lobe 405-b and grating lobe 420 may not satisfy a MPE constraint. Such grating lobes 420 may result in violation of one or more MPE constraints. For example, the magnitude, direction, or both, of grating lobe 420 may violate one or more MPE constraints, as described in greater detail with reference to FIG. 5.

In some examples, a UE may determine which beams (e.g., in which frequency ranges) satisfy MPE constraints. For instance, an uplink beam as illustrated with reference to beam configuration scheme 400 may satisfy MPE constraints. However (e.g., for the same frequency range), an uplink beam as illustrated with reference to beam configuration scheme 401 may not satisfy the same MPE constraints. A UE operating in higher frequency bands (e.g., FR4), may utilize a receive chain for a wide bandwidth, and may use a fixed inter-antenna element spacing. The inter-antenna element spacing may be smaller for the higher frequency wide bandwidth, resulting in some uplink beams resulting in grating lobes 420. That is, as a size of d between antenna elements decreases (e.g., for an antenna array used for a wide bandwidth), the chances of grating lobes 420 associated with a particular uplink beam may increase. Thus, although an uplink beam described with reference to beam configuration scheme 401 may be a preferred or best uplink beam for a particular frequency band, such an uplink beam may not satisfy one or more MPE constraints.

In some examples, as described with reference to FIG. 5, a UE may determine a preferred downlink beam based on a beam refinement procedure. However, a reciprocal uplink beam may not satisfy MPE constraints. Thus, as described in greater detail with reference to FIGS. 5-7, the UE may identify a different uplink beam that does satisfy the MPE constraints, and may indicate such an uplink beam to the base station for a particular frequency band. In some examples, the UE may determine and indicate one or more uplink beams that satisfy MPE constraints for each frequency band, carrier, BWP, or the like, or may indicate an uplink beam that satisfies the constraints for multiple bands, carriers, BWPs, etc. In some examples, the UE may indicate to the base station one or more parameter values that it can apply to a beam in a frequency band to satisfy MPE constraints.

Figure 5:
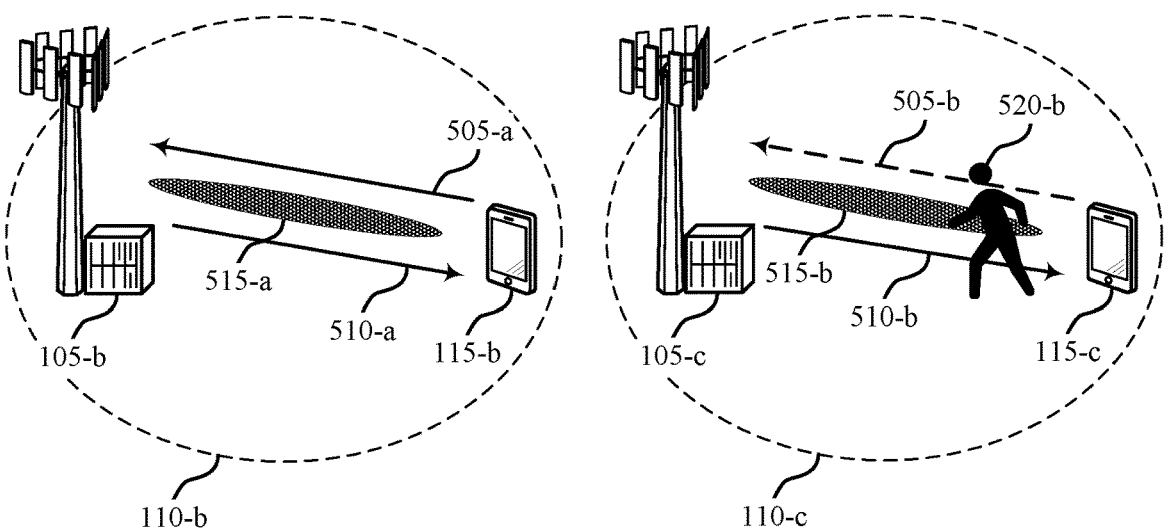
FIG. 5 illustrates examples of wireless communications systems that supports permissible exposure and grating lobes in wide bandwidth operations in accordance with aspects of the present disclosure.
Figure 5:
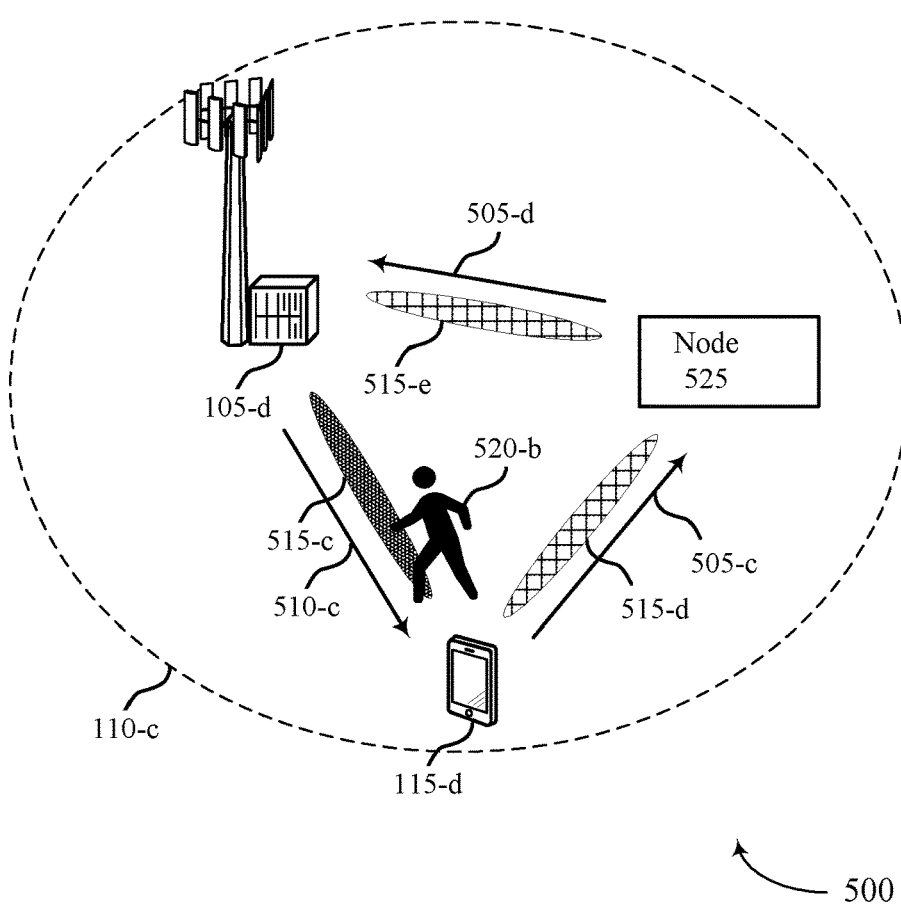

FIG. 5 illustrates examples of wireless communications systems 500, 501, and 502 that support multi-panel power reporting techniques in accordance with aspects of the present disclosure. In some examples, the various example wireless communications systems of FIG. 5 may implement aspects of wireless communications system 100. For example, the wireless communications systems 500, 501, and 502 may include UEs 115 and base stations 105, which may be examples of the corresponding devices as described with reference to FIGS. 1 and 2.

The wireless communications system 500 may illustrate an example of communications between a UE 115-b and a base station 105-b in a geographic coverage area 110-b. The UE 115-b and the base station 105-b may communicate using a beam 515-a (e.g., one or more beams 515-a associated with a panel of the UE 115-b). For example, the UE 115-b may send uplink transmissions 505-a using the beam 515-a and may receive downlink transmissions 510-a from the base station 105-b (e.g., using a reception beam of the first panel used to transmit uplink transmissions 505-a).

The wireless communications system 501 may illustrate an example of communications between a UE 115-c and a base station 105-c in a geographic coverage area 110-c. Generally, the wireless communications system 501 may illustrate an example of an MPE event. For example, a person 520-a (or other objects/conditions) may be in a proximity and/or orientation that satisfies a threshold. As an illustrative example, the person 520-a may be located such that the uplink transmission 505-b, using a configured power, may exceed a threshold power exposure of the person 520-a. For instance, a grating lobe 420, as illustrated with reference to FIG. 4, may be directed at or through the person 520-a (e.g., a finger 320 as illustrated with reference to FIG. 3). Thus, although downlink transmissions 510-b may not violate MPE constraints, uplink transmissions using beam 515-*b* (e.g., a reciprocal beam to the downlink beam used to transmit downlink transmissions 510-*b*) may result in an MPE event that is not permitted under the MPE constraints. To ensure that the MPE constraints (e.g., an MPE threshold defining an amount of MPE) for the person 520-*a* is satisfied, the UE 115-*c* may be configured to select a different beam than beam 515-*b*.

The wireless communications system 502 may illustrate an example of a method to maintain communications with the base station 105-*d* in an MPE event. For example, the UE 115-*d* may continue to receive downlink transmissions 510-*c* from the base station 105-*d* using the beam 515-*c*. Additionally or alternatively, the UE 115-*d* may use a second panel (e.g., or a different configuration or subset of antenna elements from the same panel) to communicate uplink transmissions 505-*c* to the base station 105-*d*. For example, the UE 115-*d* may include a second panel that is not experiencing an MPE event (e.g., transmission using the beam 515-*d* may satisfy a threshold power exposure of the person 520-*b*, but uplink transmission using a beam 515-*c* may fail to satisfy the threshold). The UE 115-*d* may switch from communicating with the first panel to communicating with the second panel in response to the MPE event (e.g., the UE 115-*d* may switch from beam 515-*c* to beam 515-*d* to satisfy a power exposure threshold for uplink transmissions 505-*c*). In other words, downlink transmissions 510-*c* may be maintained and uplink transmissions 505-*c* may be altered. In some examples, the UE 115-*d* may receive downlink transmissions 510-*c* from a first TRP of the base station 150-*d* and communicate the uplink transmissions 505-*c* via a node 525 (e.g., a second TRP of the base station 150-*d*). Additionally, or alternatively, the node may be an example of another base station 105, among other examples of wireless nodes. In some other examples, the UE 115-*d* may send uplink transmissions 505-*c* to the first TRP of the base station 105-*d* using the second beam 515-*d*. In some examples, the UE 115-*d* may send uplink transmissions 505-*c* directly to base station 105-*d* (e.g., instead of via node 525), using a different beam than beam 515-*c* (e.g., a beam 515-*d* that is oriented toward base station 105-*d* at an angle that is at least slightly different than the direction of beam 515-*c*).

In some examples, a UE 115 (e.g., UE 115-*c* or UE 115-*d*) may perform a power backoff technique to maintain communications without violating a permissible exposure constraint (e.g., an MPE constraint). However, such power backoff techniques may be relatively inefficient. For example, the UE 115-*d* may report a power headroom of the UE 115-*d* but may be unable to report multi-panel power headroom values. In such examples, the UE 115-*d* may be unable to accurately report power headroom values for different panels or the base station 105-*d* may be unaware of the MPE event, which may result in inefficient communications or relatively poor power management. For example, the base station 105-*d* may schedule uplink resources expecting a power of uplink transmissions 505 above a power threshold of the reduced power for the first panel (e.g., in response to the MPE event), the base station 105-*d* may fail to allocate resources to the second panel capable of using more power for uplink transmissions 505-*c* (e.g., resulting in inefficient communications), among other examples.

In accordance with the techniques described herein, the wireless communications systems 500, 501, and/or 502 may implement multi-panel power headroom reports for communications between devices, which may enable the devices to accurately indicate power capabilities, more efficiently schedule communications, or enhance power management, among other benefits. For example, a UE 115 may communicate with a base station 105 using a first panel and a second panel (e.g., a first antenna panel and a second antenna panel) in accordance with SDM, FDM, TDM, or any combination thereof. The UE 115 may determine one or more panel specific power headroom values to report to the base station 105. For example, the UE 115 may calculate a first power headroom value for the first panel (e.g., based on one or more panel specific parameters, such as a maximum transmit power parameter associated with the first panel, a maximum power reduction parameter associated with the first panel, etc.). Additionally or alternatively, the UE 115 may calculate a second power headroom value for the second panel (e.g., using one or more panel specific parameters, such as a maximum transmit power parameter associated with the second panel, a maximum power reduction parameter associated with the second panel, etc.).

The UE 115 may transmit a power headroom report indicating the one or more panel specific power headroom values. In some examples, the UE 115 may transmit the power headroom report based on identifying that one or more thresholds associated with the power headroom report are satisfied. For example, the UE 115 may determine that a timer associated with the power headroom report has expired, that one or more power backoff metrics satisfy one or more thresholds (e.g., a change in a power backoff metric for the first panel, the second panel, or both may satisfy a change threshold), that a medium access control (MAC) entity has uplink resources for an uplink transmission, or any combination thereof. The power headroom report may include one or more fields indicating the panel specific power headroom values. For example, the UE 115 may populate one or more fields of the report, the one or more fields indicating whether the first power headroom value for the first panel is included in the report, whether the second power headroom value for the second panel is included in the report, whether a MAC entity applies power management techniques, whether a panel specific power headroom value is based on a real transmission format or a virtual transmission format, or any combination thereof, among other examples of fields. However, as discussed above, such power backoff based techniques may not be efficient. For instance, UE 115-*d* may switch between one carrier frequency in which beam 515-*c* satisfies permissible exposure constraints (MPE requirements), and another carrier frequency in which beam 515-*c* does not satisfy MPE requirements.

In some examples, as described in greater detail with reference to FIG. 6, a UE 115 may indicate a best or preferred beam for uplink transmissions to be used at a base station 105 as a function of carrier frequency to meet permissible exposure constraints due to grating lobes at the UE 115. For instance, the UE 115 may transmit, to the base station 105, an indication of an uplink beam for a frequency band (e.g., carrier, band, subband, BWP, or the like). In some cases, as described in greater detail with reference to FIG. 4, a grating lobe 420 may change direction with respect to frequency depending on carrier frequency (e.g., of a primary cell (PCell) or primary secondary cell (PScell)). As a result of the changing direction of grating lobes 420 with respect to frequency, uplink beams in some frequency ranges may satisfy permissible exposure constraints, but may not satisfy MPE requests in other frequency ranges. Thus, depending on which beams can meet a permissible exposure constraint, the UE 115 may indicate frequency-dependent TCI state or beam indications to the base station 105. For instance, the UE may indicate a beam that satisfies a permissible exposure constraint on each frequency range of a set of frequency ranges (e.g., bands, carriers, BWPs, or the like).

In some examples, as described in greater detail with reference to FIG. 6, the UE 115 may operate in either an intra-band or inter-band CA mode. The UE 115 may provide different beam indications for different bands, each of which could be permissible exposure compliant. For example, the UE 115 may indicate an uplink beam that satisfies a permissible exposure constraint for one carrier or a subset of carriers of a CA that satisfy an MPE constraint. In some examples, the UE 115 may indicate whether a certain uplink beam (e.g., on one band) is permissible exposure compliant in a different band for intra-band or inter-band CA operations. The UE 115 or base station 105 may coordinate to determine bands over which intra-band or inter-band CA operations are possible using a same beam for uplink transmissions.

In some examples, as described in greater detail with reference to FIG. 6, the UE 115 may perform carrier frequency dependent beam training. For example, the base station 105 may initiate frequency dependent beam training to support intra-band CA modes or inter-band CA modes. The base station 105 may instruct the UE to perform uplink beam training across various frequencies (e.g., of a CA mode) to determine best or preferred uplink beams that satisfy MPE constraints for each band or carrier of the CA mode. Conventional techniques may rely on beam reciprocity from downlink beam training to indicate an uplink beam for the UE 115 to use. However, as described with reference to FIG. 5, the downlink beam in one band may lead to a corresponding uplink beam in the same band that satisfies a permissible exposure constraint. In another band, a downlink beam may not lead to a corresponding uplink beam in the same band that satisfies the permissible exposure constraint.

In some examples, as described in greater detail with reference to FIG. 7, the UE 115 may indicate a carrier frequency or BWP dependent value for one or more parameter values with which the UE 115 is capable of generating the beam on the frequency band without violating MPE constraints. That is, the base station 105 may configure the UE with a frequency band, and uplink beam, or both. In response, the UE 115 may transmit an indication of one or more parameter values for the frequency band and uplink beam that will permit the UE 115 to generate the uplink beam within the frequency band without violating permissible exposure constraints. In some examples, the one or more parameter values may include an MPE threshold value (e.g., MPE-threshold value), a power backoff value (e.g., MPE P-MPR, which may refer to a power backoff for which the UE could transmit on the beam without generating a grating lobe that violates power MPE constraints), a time value (e.g., mpe-ProhibitTimer, which may define an amount of time the UE 115 can transmit on the beam within the frequency band without violating temporal MPE constraints). In some examples, if mpe-Reporting-FR2 is configured, mpe-ProbihitTimer is not running, and the measured P-MPR applied to meeting FR2 MPE requirement is equal to or larger than mpe-Threshold for at least one activated FR2 serving cell since a last transmission of a power headroom report (PHR) in a MAC entity, in which case the PHR may be referred to as a MPE P-MPR report. Conventional techniques may include transmitting a single parameter value or set of parameter values for an entire band or set of bands. However, as described with reference to FIG. 7, the UE 115 may transmit values or sets of values that are frequency dependent. That is, the UE 115 may transmit an indication of parameter values for each frequency band of an inter-band CA mode, or each carrier of an intra-band CA mode.

Figure 6:
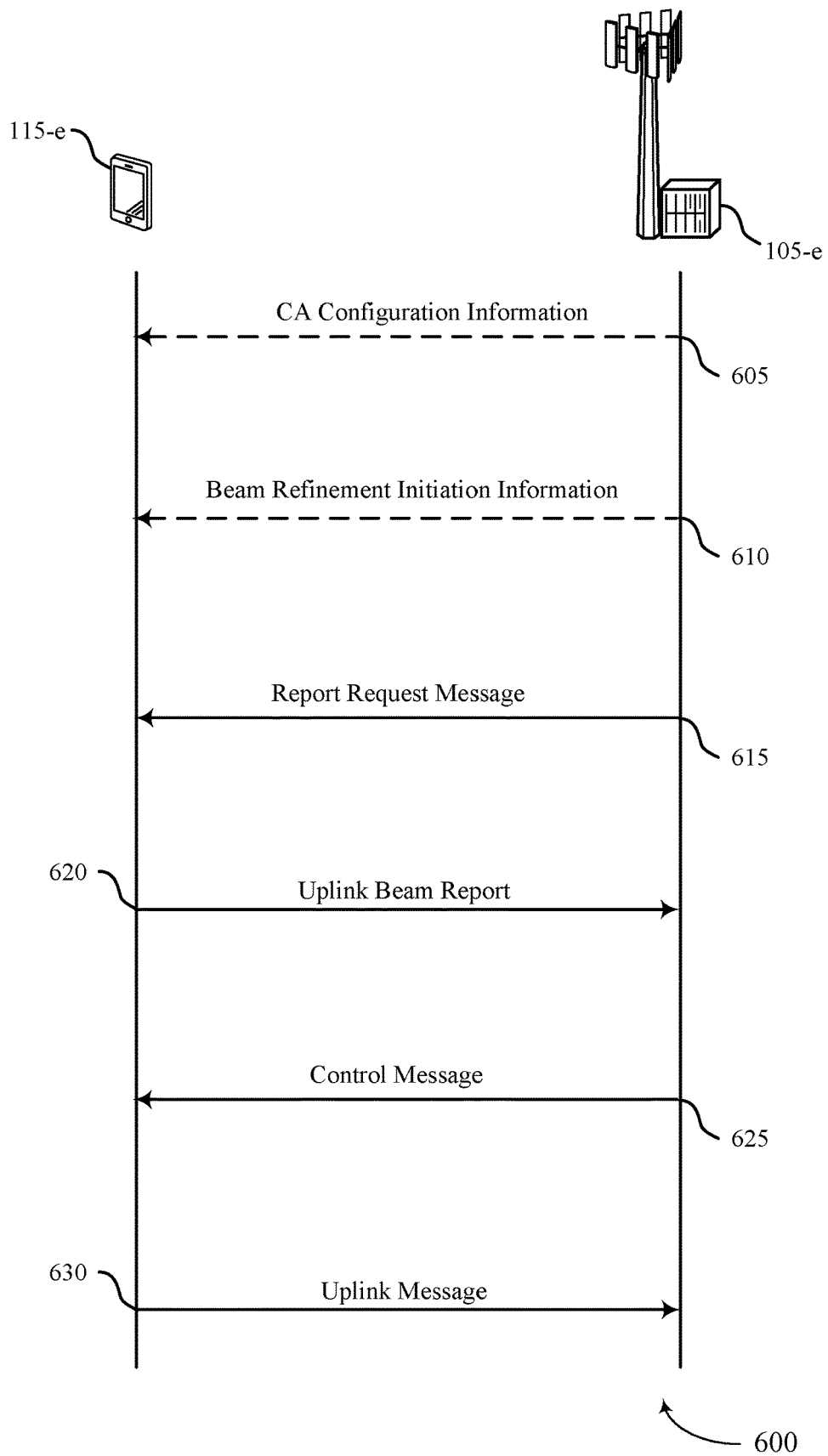
FIG. 6 illustrates an example of a process flow that supports permissible exposure and grating lobes in wide bandwidth operations in accordance with aspects of the present disclosure.

FIG. 6 illustrates an example of a process flow 600 that supports permissible exposure and grating lobes in wide bandwidth operations in accordance with aspects of the present disclosure. Process flow 600 may include a UE 115-c and a base station 105-e, which may be examples of corresponding devices described with reference to FIGS. 1-5.

At 615, base station 105-e may transmit, and UE 115-e may receive, a report request message. The report request message may prompt UE 115-e to report an uplink beam for a frequency band.

At 620, UE 115-e may transmit, and base station 105-e may receive, a report indicating a first uplink beam for which UE 115-e is capable of generating a main lobe and a grating lobe of the first uplink beam that each satisfy an MPE constraint for the frequency band.

In some examples, the report may indicate the first uplink beam from a set of available uplink beams based at least in part on a magnitude of the grating lobe of the first uplink beam satisfying the permissible exposure constraint in a direction of the grating lobe that is a function of the frequency band. That is, the UE may identify, from a set of uplink beams, which one or more uplink beams have grating lobes having magnitudes or directions that satisfy the permissible exposure constraints for a particular frequency band.

In some examples, the report may indicate a first uplink beam from a set of available uplink beams based at least in part on a magnitude of the main lobe of the first uplink beam satisfying the MPE constraint in a direction of the first uplink beam.

In some examples, at 65, base station 105-e may transmit control signaling including CA configuration information to UE 115-e. The CA configuration information may be for multiple frequency bands that include the frequency band indicated in the uplink beam report. Having received the CA configuration information at 605, UE 115-e may transmit the report at 620 indicating one or more uplink beams for which UE 115-e is capable of generating a respective main lobe and grating lobe that each satisfy a permissible exposure constraint in a respective frequency band of the multiple frequency bands. That is, the uplink beam report may indicate multiple uplink beams, each of which is associated with a grating lobe and a main lobe that satisfy MPE constraints. The CA mode may be an inter-band CA mode or an intra-band CA mode. In some examples, the uplink beam report may include an indication of at least one uplink beam for each frequency band (e.g., each carrier, each band, each BWP, or the like) of the CA mode. For instance, the uplink beam report may indicate an uplink beam that satisfies permissible exposure constraints in each carrier of an intra-band CA mode, or for each band or carrier of an inter-band CA mode, or the like. In such examples, the uplink beam report may include an indication of at least a first uplink beam and a second uplink beam, each of which is associated with main and grating lobes that satisfy the permissible exposure constraints. In some cases, one or more indicated uplink beams may satisfy the permissible exposure constraints in more than one frequency band (e.g., a subset of the frequency bands of the CA mode).

In some examples, at 610, base station 105-e may transmit beam refinement initiation information to UE 115-e. For example, base station 105-e may transmit control signaling initiating a beam refinement procedure for multiple frequency bands f the multiple frequency bands indicated in CA configuration (e.g., received at 605). In such examples, UE 115-e may perform an uplink beam refinement procedure (e.g., instead of assuming that an uplink beam that is reciprocal to a refined downlink beam, will satisfy permissible exposure requirements). The beam refinement procedure may include sweeping through the multiple uplink beams to receive one or more reference signals, and performing measurements on received reference signals. Having performed the beam refinement procedure, UE 115-e may transmit the report at 620, which may indicate one or more uplink beams for which the UE 115-e is capable of generating a respective main lobe and a respective grating lobe that each satisfy a permissible exposure constraint in a respective frequency band of the multiple frequency bands based at least in part on the control signaling. In some cases, the uplink beam or beams indicated in the uplink beam report may be reciprocal to downlink beams in the same frequency band. In other cases, the uplink beam or beams indicated in the uplink beam report may not be reciprocal to downlink beams in the same frequency band.

At 625, base station 105-e may transmit, and UE 115-e may receive, a control message scheduling the UE to transmit an uplink message within the frequency band.

AT 630, UE 115-e may transmit, and base station 105-e may receive, the scheduled uplink message. UE 115-e may transmit the uplink message within the frequency band using the first uplink beam (e.g., which satisfies the permissible exposure constraints).

Figure 7:
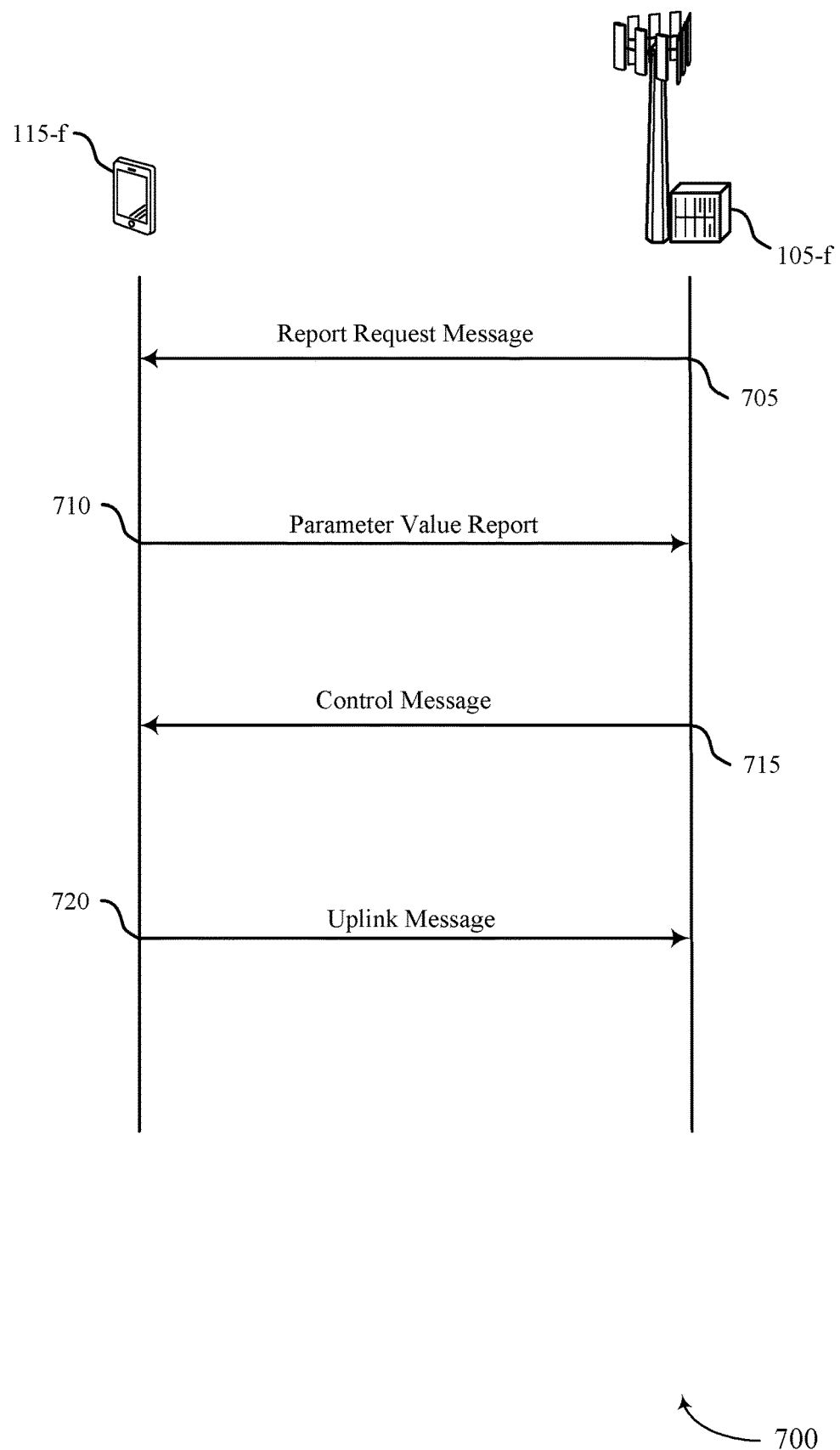
FIG. 7 illustrates an example of a process flow that supports permissible exposure and grating lobes in wide bandwidth operations in accordance with aspects of the present disclosure.

FIG. 7 illustrates an example of a process flow 700 that supports maximum permissible exposure and grating lobes in wide bandwidth operations in accordance with aspects of the present disclosure. Process flow 700 may include a UE 115-f and a base station 105-f, which may be examples of corresponding devices described with reference to FIGS. 1-6.

At 705, base station 105-f may transmit, and UE 115-f may receive, a report request message. The report request message may indicate a first uplink beam and a frequency band (e.g., for the UE to use to transmit uplink signaling). The report request may also prompt UE 115-f to report one or more parameter values for the first uplink beam for which UE 115-f is capable of generating (e.g., using the one or more parameter values) a main lobe and a grating lobe for the first uplink beam that each satisfy a permissible exposure constraint for the frequency band. The parameter values may include a permissible exposure threshold, a permissible exposure timer, an indication of the frequency band, a power backoff value, or any combination thereof. In some examples, the indication of the uplink beam may include an indication of a transmission configuration indication (TCI) state associated with the uplink beam. In some examples, the report may include a beam index for the uplink beam.

At 710, UE 115-f may transmit a parameter value report. The parameter value report may include an indication of the one or more parameter values for the first uplink beam in the frequency band. The parameter values may include a permissible exposure threshold, a permissible exposure timer, an indication of the frequency band, a power backoff value, or any combination thereof. The reported one or more parameters values may indicate the one or more parameter values that the UE 115-f may use to generate the uplink beam within the frequency band where the main lobe and one or more grating lobes of the uplink beam each satisfy the permissible exposure constraint.

In some examples, the report request message may indicate multiple uplink beams. In such examples, the parameter value report may include a set of parameter values for each of the multiple uplink beams.

In some examples, the report request message may indicate multiple frequency bands (e.g., at least a first and second frequency band). In such examples, the report may indicate a set of one or more parameters values that can be applied to the uplink beam across multiple frequency bands (e.g., the first and second frequency band). Or, in some examples, the report may indicate multiple sets of parameter values to be applied to the uplink beam in at least one (e.g., each) frequency band.

At 715, base station 105-f may transmit, and UE 115-f may receive, a control message scheduling UE 115-f to transmit an uplink message within the frequency band.

At 720, UE 115-f may transmit, and base station 105-f may receive, the uplink message using the first uplink beam according to the parameter values indicated at 710 within the frequency band.

Figure 8:
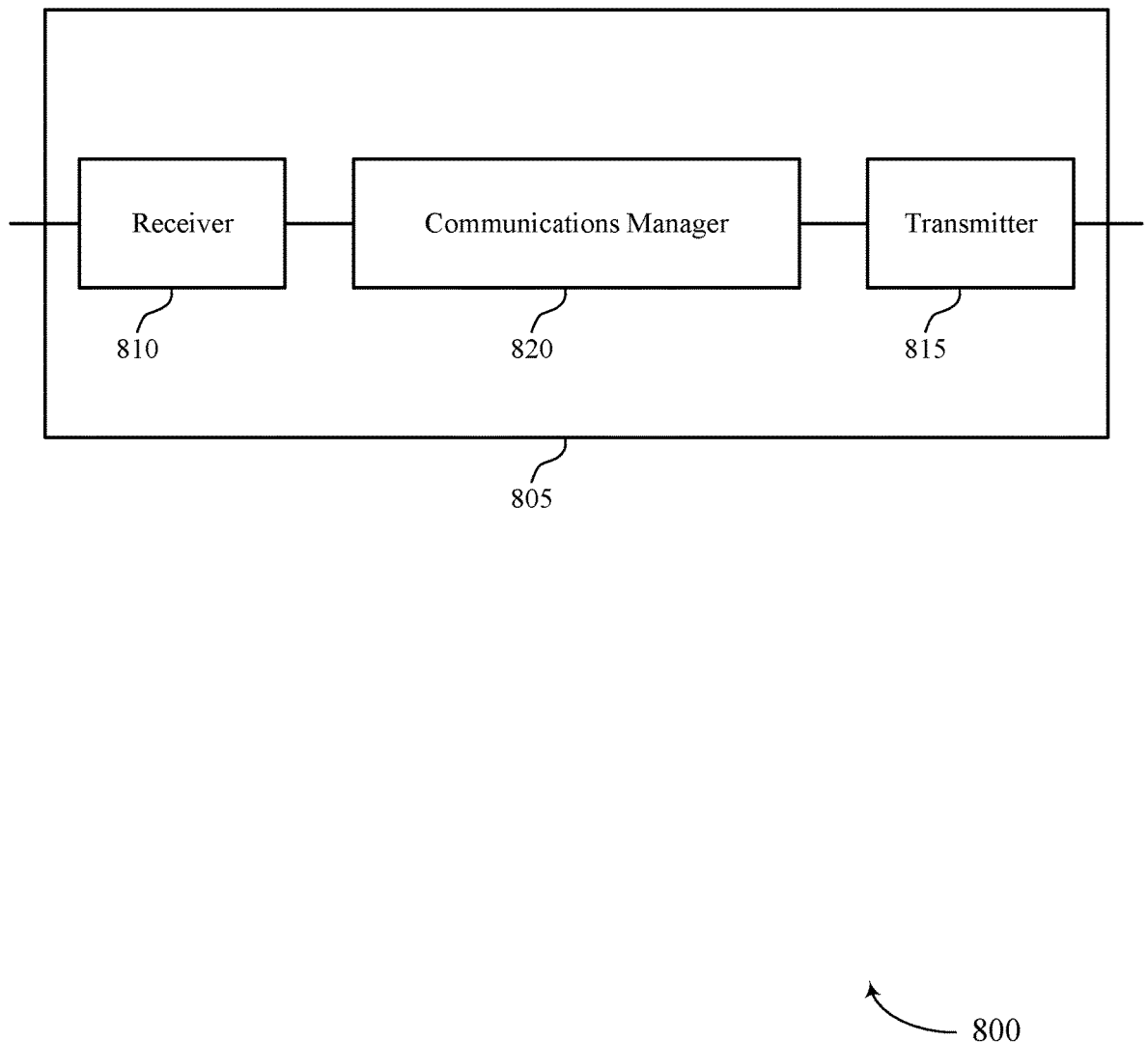
FIGS. 8 and 9 show block diagrams of devices that support permissible exposure and grating lobes in wide bandwidth operations in accordance with aspects of the present disclosure.

FIG. 8 shows a block diagram 800 of a device 805 that supports maximum permissible exposure and grating lobes in wide bandwidth operations in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to maximum permissible exposure and grating lobes in wide bandwidth operations). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to maximum permissible exposure and grating lobes in wide bandwidth operations). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of maximum permissible exposure and grating lobes in wide bandwidth operations as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving, from a base station, a report request message prompting the UE to report an uplink beam for a frequency band. The communications manager 820 may be configured as or otherwise support a means for transmitting, to the base station, a report indicating a first uplink beam for which the UE is capable of generating a main lobe and a grating lobe of the first uplink beam that each satisfy a permissible exposure constraint for the frequency band. The communications manager 820 may be configured as or otherwise support a means for receiving, from the base station, a control message scheduling the UE to transmit an uplink message within the frequency band. The communications manager 820 may be configured as or otherwise support a means for transmitting the uplink message within the frequency band using the first uplink beam.

Additionally, or alternatively, the communications manager 820 may support wireless communications at a UE in accordance with examples as disclosed herein. For example, the communications manager 820 may be configured as or otherwise support a means for receiving, from a base station, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band. The communications manager 820 may be configured as or otherwise support a means for transmitting, to the base station, a report indicating the one or more parameter values for the first uplink beam. The communications manager 820 may be configured as or otherwise support a means for receiving, from the base station based on the report, a control message scheduling the UE to transmit an uplink message within the frequency band. The communications manager 820 may be configured as or otherwise support a means for transmitting, within the frequency band, the uplink message using the first uplink beam according to the one or more parameter values.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for determining and communicating uplink beams for which a device (e.g., a UE) is capable of satisfying permissible exposure constraints in a given frequency band, which may result in improved safety standards for users, increased throughput and reliability of communications, and decreased system latency.

Figure 9:
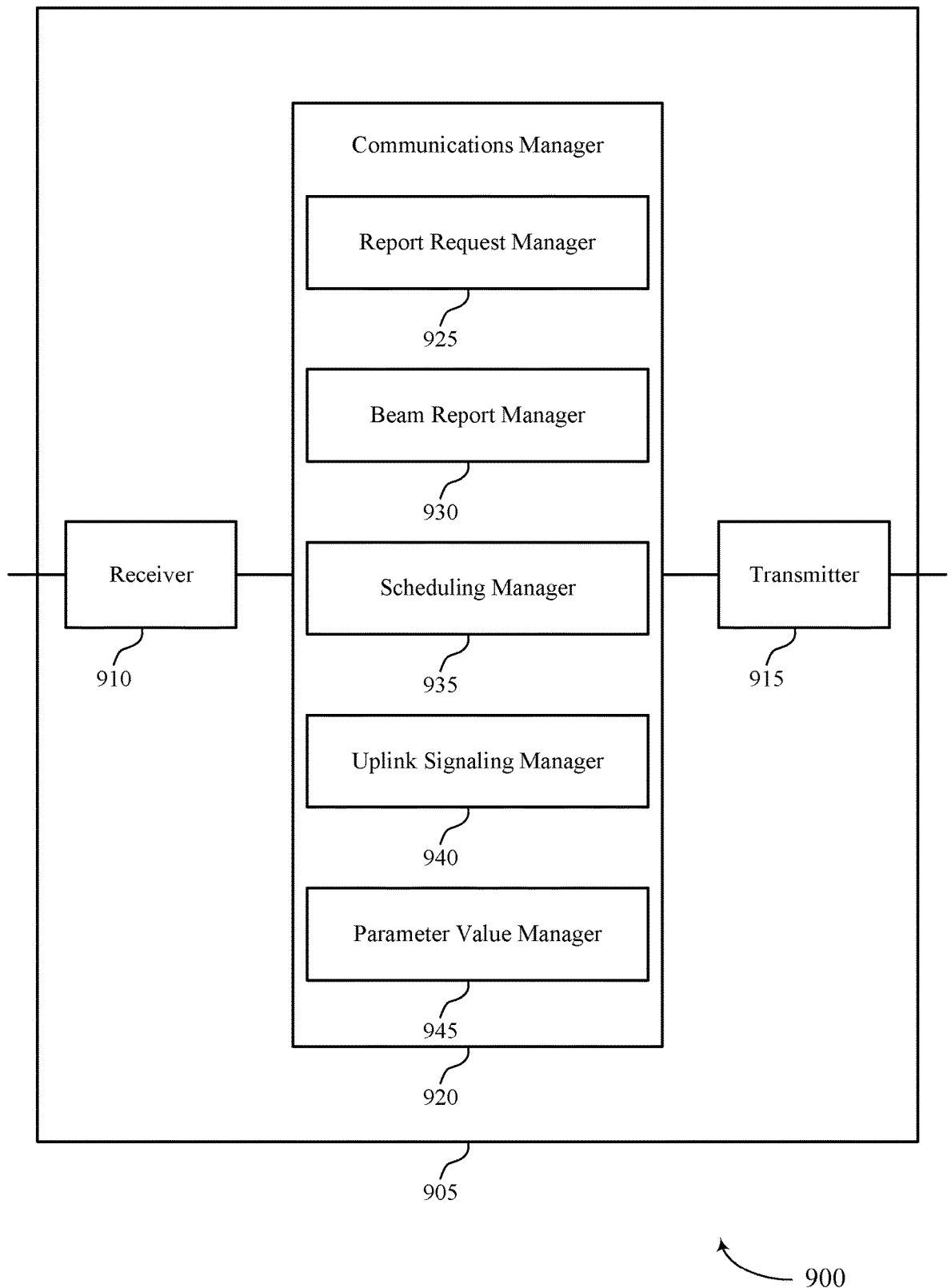

FIG. 9 shows a block diagram 900 of a device 905 that supports maximum permissible exposure and grating lobes in wide bandwidth operations in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to maximum permissible exposure and grating lobes in wide bandwidth operations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to maximum permissible exposure and grating lobes in wide bandwidth operations). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of maximum permissible exposure and grating lobes in wide bandwidth operations as described herein. For example, the communications manager 920 may include a report request manager 925, a beam report manager 930, a scheduling manager 935, an uplink signaling manager 940, a parameter value manager 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The report request manager 925 may be configured as or otherwise support a means for receiving, from a base station, a report request message prompting the UE to report an uplink beam for a frequency band. The beam report manager 930 may be configured as or otherwise support a means for transmitting, to the base station, a report indicating a first uplink beam for which the UE is capable of generating a main lobe and a grating lobe of the first uplink beam that each satisfy a permissible exposure constraint for the frequency band. The scheduling manager 935 may be configured as or otherwise support a means for receiving, from the base station, a control message scheduling the UE to transmit an uplink message within the frequency band. The uplink signaling manager 940 may be configured as or otherwise support a means for transmitting the uplink message within the frequency band using the first uplink beam.

Additionally, or alternatively, the communications manager 920 may support wireless communications at a UE in accordance with examples as disclosed herein. The report request manager 925 may be configured as or otherwise support a means for receiving, from a base station, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band. The parameter value manager 945 may be configured as or otherwise support a means for transmitting, to the base station, a report indicating the one or more parameter values for the first uplink beam. The scheduling manager 935 may be configured as or otherwise support a means for receiving, from the base station based on the report, a control message scheduling the UE to transmit an uplink message within the frequency band. The uplink signaling manager 940 may be configured as or otherwise support a means for transmitting, within the frequency band, the uplink message using the first uplink beam according to the one or more parameter values.

Figure 10:
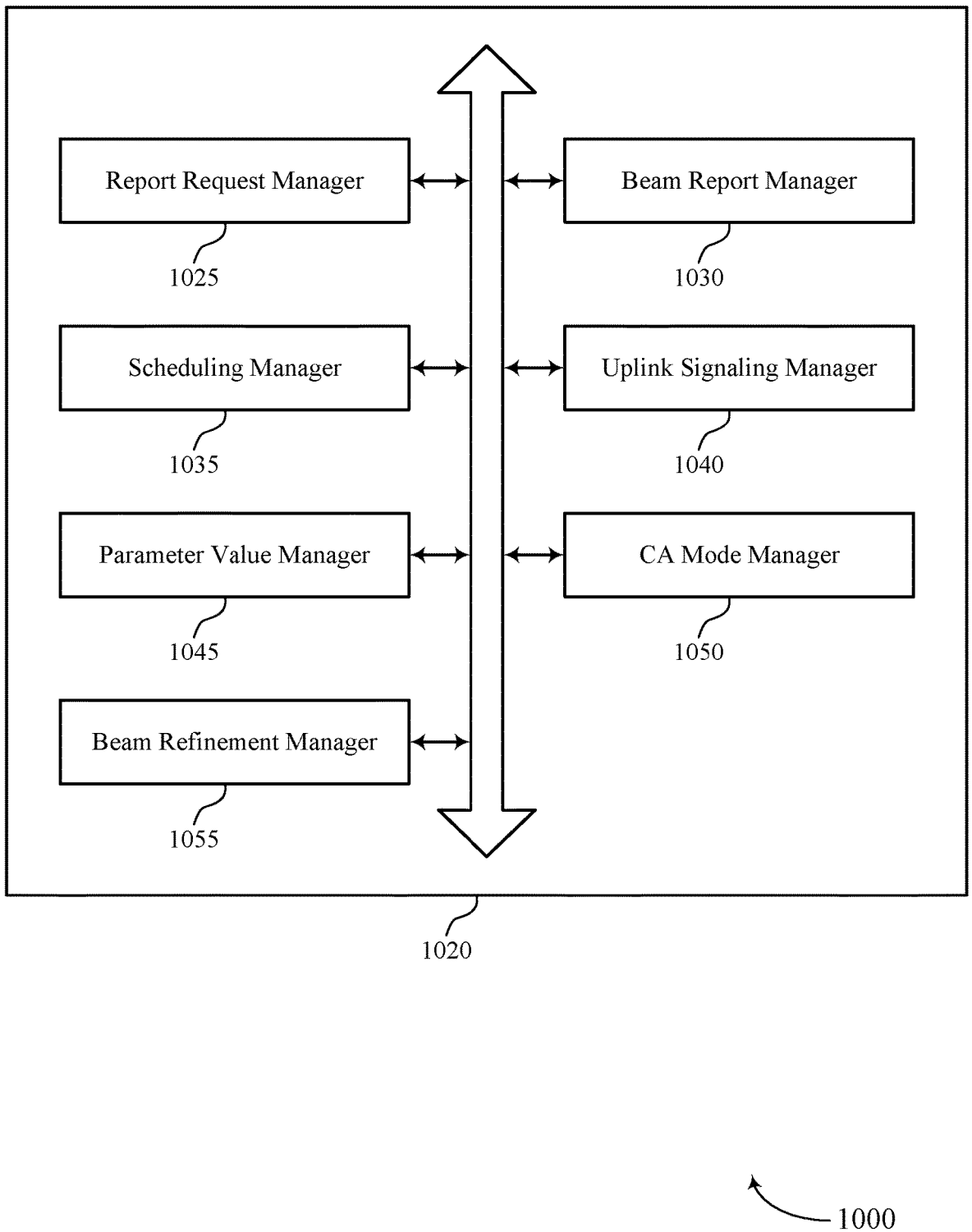
FIG. 10 shows a block diagram of a communications manager that supports permissible exposure and grating lobes in wide bandwidth operations in accordance with aspects of the present disclosure.

FIG. 10 shows a block diagram 1000 of a communications manager 1020 that supports maximum permissible exposure and grating lobes in wide bandwidth operations in accordance with aspects of the present disclosure. The communications manager 1020 may be an example of aspects of a communications manager 820, a communications manager 920, or both, as described herein. The communications manager 1020, or various components thereof, may be an example of means for performing various aspects of maximum permissible exposure and grating lobes in wide bandwidth operations as described herein. For example, the communications manager 1020 may include a report request manager 1025, a beam report manager 1030, a scheduling manager 1035, an uplink signaling manager 1040, a parameter value manager 1045, a CA mode manager 1050, a beam refinement manager 1055, or any combination thereof. Each of these components may communicate, directly or indirectly, with one another (e.g., via one or more buses).

The communications manager 1020 may support wireless communications at a UE in accordance with examples as disclosed herein. The report request manager 1025 may be configured as or otherwise support a means for receiving, from a base station, a report request message prompting the UE to report an uplink beam for a frequency band. The beam report manager 1030 may be configured as or otherwise support a means for transmitting, to the base station, a report indicating a first uplink beam for which the UE is capable of generating a main lobe and a grating lobe of the first uplink beam that each satisfy a permissible exposure constraint for the frequency band. The scheduling manager 1035 may be configured as or otherwise support a means for receiving, from the base station, a control message scheduling the UE to transmit an uplink message within the frequency band. The uplink signaling manager 1040 may be configured as or otherwise support a means for transmitting the uplink message within the frequency band using the first uplink beam.

In some examples, to support transmitting the report, the beam report manager 1030 may be configured as or otherwise support a means for transmitting the report indicating the first uplink beam from a set of available uplink beams based on a magnitude of the grating lobe of the first uplink beam satisfying the permissible exposure constraint in a direction of the grating lobe that is a function of the frequency band.

In some examples, to support transmitting the report, the beam report manager 1030 may be configured as or otherwise support a means for transmitting the report indicating the first uplink beam from a set of available uplink beams based on a magnitude of the main lobe of the first uplink beam satisfying the permissible exposure constraint in a direction of the first uplink beam.

In some examples, the CA mode manager 1050 may be configured as or otherwise support a means for receiving, from the base station, control signaling configuring the UE to operate in a carrier aggregation mode for a set of multiple frequency bands including the frequency band. In some examples, the beam report manager 1030 may be configured as or otherwise support a means for transmitting the report indicating one or more uplink beams for which the UE is capable of generating a respective main lobe and a respective grating lobe that each satisfy a permissible exposure constraint in a respective frequency band of the set of multiple frequency bands.

In some examples, to support transmitting the report, the beam report manager 1030 may be configured as or otherwise support a means for transmitting the report indicating a second uplink beam for which the UE is capable of generating a second main lobe and a second grating lobe of the second uplink beam that each satisfy a permissible exposure constraint for a second frequency band of the set of multiple frequency bands.

In some examples, to support transmitting the report, the beam report manager 1030 may be configured as or otherwise support a means for transmitting the report indicating the first uplink beam for which the UE is capable of generating the main lobe and the grating lobe of the first uplink beam that each satisfy a permissible exposure constraint for a second frequency band.

In some examples, to support transmitting the report, the beam report manager 1030 may be configured as or otherwise support a means for transmitting, to the base station, the report indicating the first uplink beam for which the UE is capable of generating the main lobe and the grating lobe of the first uplink beam that each satisfy a permissible exposure constraint for a subset of the set of multiple frequency bands.

In some examples, the beam refinement manager 1055 may be configured as or otherwise support a means for receiving, from the base station, control signaling initiating a beam refinement procedure for multiple frequency bands of the set of multiple frequency bands for the carrier aggregation mode. In some examples, the beam refinement manager 1055 may be configured as or otherwise support a means for transmitting the report indicating one or more uplink beams for which the UE is capable of generating a respective main lobe and a respective grating lobe that each satisfy a permissible exposure constraint in a respective frequency band of the multiple frequency bands based on the control signaling.

In some examples, the first uplink beam is reciprocal to a downlink beam determined for the frequency band in the beam refinement procedure.

In some examples, the first uplink beam is not reciprocal to a downlink beam determined for the frequency band in the beam refinement procedure.

In some examples, the carrier aggregation mode includes an inter-band carrier aggregation mode or an intra-band carrier aggregation mode.

In some examples, to support transmitting the report, the beam report manager 1030 may be configured as or otherwise support a means for transmitting the report including a transmission configuration indicator state of the first uplink beam.

Additionally, or alternatively, the communications manager 1020 may support wireless communications at a UE in accordance with examples as disclosed herein. In some examples, the report request manager 1025 may be configured as or otherwise support a means for receiving, from a base station, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band. The parameter value manager 1045 may be configured as or otherwise support a means for transmitting, to the base station, a report indicating the one or more parameter values for the first uplink beam. In some examples, the scheduling manager 1035 may be configured as or otherwise support a means for receiving, from the base station based on the report, a control message scheduling the UE to transmit an uplink message within the frequency band. In some examples, the uplink signaling manager 1040 may be configured as or otherwise support a means for transmitting, within the frequency band, the uplink message using the first uplink beam according to the one or more parameter values.

In some examples, the report request manager 1025 may be configured as or otherwise support a means for receiving the report request indicating a set of multiple uplink beams. In some examples, the beam report manager 1030 may be configured as or otherwise support a means for transmitting the report indicating respective one or more parameter values for each uplink beam of the set of multiple uplink beams.

In some examples, the report request manager 1025 may be configured as or otherwise support a means for receiving the report request message indicating a second frequency band, the report prompting the UE to report one or more second parameter values for the first uplink beam for which the UE is capable of generating, using the one or more parameter values, a main lobe and a grating lobe of the first uplink beam that each satisfy a permissible exposure constraint for the second frequency band. In some examples, the beam report manager 1030 may be configured as or otherwise support a means for transmitting, to the base station, the report indicating the one or more second parameter values for the first uplink beam. In some examples, the scheduling manager 1035 may be configured as or otherwise support a means for receiving, from the base station based on the report, the control message scheduling the UE to transmit a second uplink message within the second frequency band. In some examples, the uplink signaling manager 1040 may be configured as or otherwise support a means for transmitting, within the second frequency band, the second uplink message using the first uplink beam according to the one or more second parameter values.

In some examples, the report request manager 1025 may be configured as or otherwise support a means for receiving the report request message indicating a second uplink beam, the report prompting the UE to report one or more second parameter values for the second uplink beam for which the UE is capable of generating, using the one or more parameter values, a main lobe and a grating lobe of the second uplink beam that each satisfy a permissible exposure constraint for the frequency band. In some examples, the beam report manager 1030 may be configured as or otherwise support a means for transmitting, to the base station, the report indicating the one or more second parameter values for the second uplink beam. In some examples, the scheduling manager 1035 may be configured as or otherwise support a means for receiving, from the base station based on the report, the control message scheduling the UE to transmit a second uplink message within the frequency band. In some examples, the uplink signaling manager 1040 may be configured as or otherwise support a means for transmitting, within the frequency band, the second uplink message using the second uplink beam according to the one or more second parameter values.

In some examples, to support receiving the report request message, the report request manager 1025 may be configured as or otherwise support a means for receiving the report request message indicating a transmission configuration state of the first uplink beam.

In some examples, to support transmitting the report, the beam report manager 1030 may be configured as or otherwise support a means for transmitting the report indicating the one or more parameter values including a permissible exposure threshold, a permissible exposure timer, an indication of the frequency band, a power backoff value, or any combination thereof, for the first uplink beam.

Figure 11:
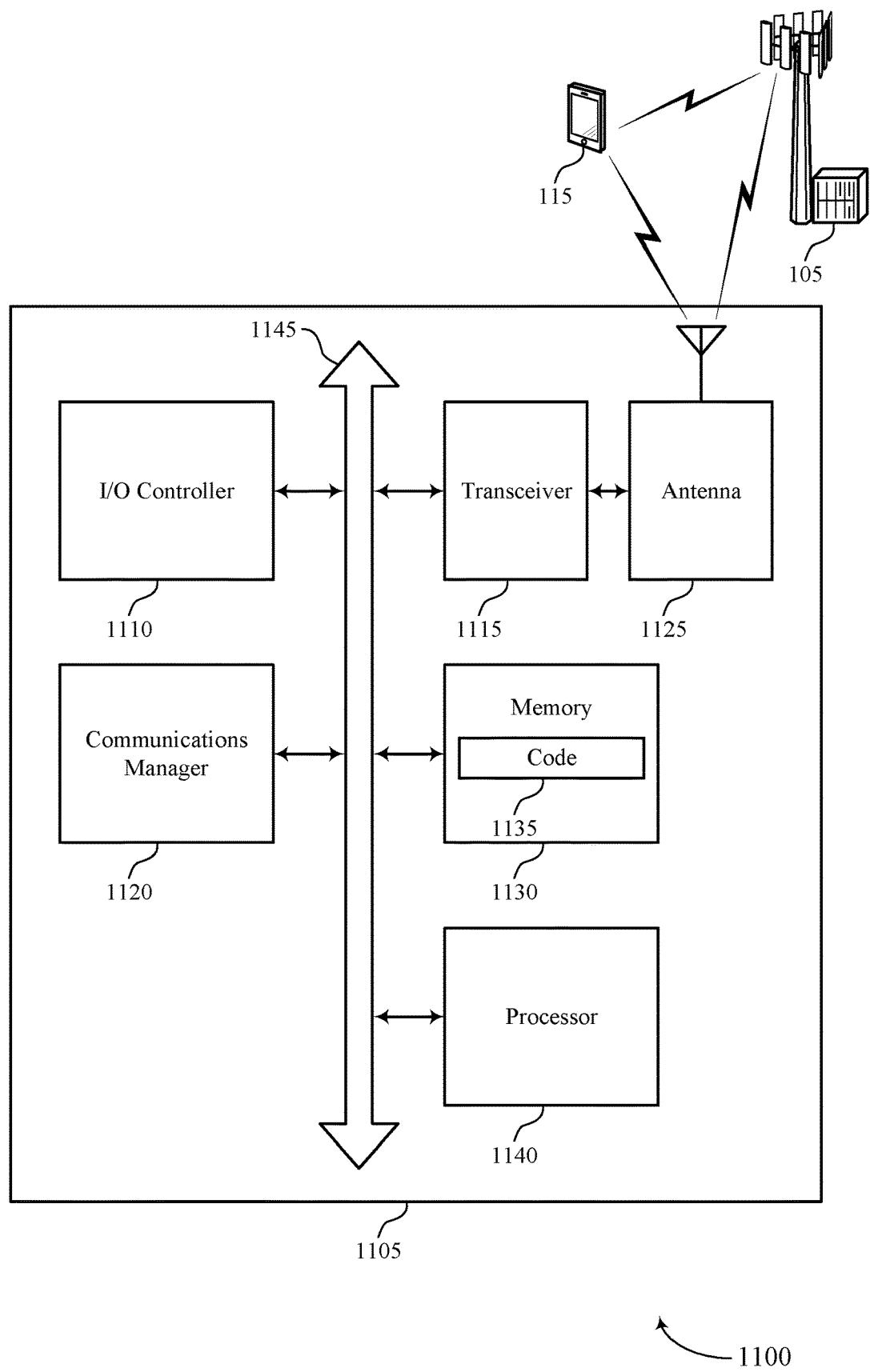
FIG. 11 shows a diagram of a system including a device that supports permissible exposure and grating lobes in wide bandwidth operations in accordance with aspects of the present disclosure.

FIG. 11 shows a diagram of a system 1100 including a device 1105 that supports maximum permissible exposure and grating lobes in wide bandwidth operations in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting maximum permissible exposure and grating lobes in wide bandwidth operations). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a base station, a report request message prompting the UE to report an uplink beam for a frequency band. The communications manager 1120 may be configured as or otherwise support a means for transmitting, to the base station, a report indicating a first uplink beam for which the UE is capable of generating a main lobe and a grating lobe of the first uplink beam that each satisfy a permissible exposure constraint for the frequency band. The communications manager 1120 may be configured as or otherwise support a means for receiving, from the base station, a control message scheduling the UE to transmit an uplink message within the frequency band. The communications manager 1120 may be configured as or otherwise support a means for transmitting the uplink message within the frequency band using the first uplink beam.

Additionally, or alternatively, the communications manager 1120 may support wireless communications at a UE in accordance with examples as disclosed herein. For example, the communications manager 1120 may be configured as or otherwise support a means for receiving, from a base station, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band. The communications manager 1120 may be configured as or otherwise support a means for transmitting, to the base station, a report indicating the one or more parameter values for the first uplink beam. The communications manager 1120 may be configured as or otherwise support a means for receiving, from the base station based on the report, a control message scheduling the UE to transmit an uplink message within the frequency band. The communications manager 1120 may be configured as or otherwise support a means for transmitting, within the frequency band, the uplink message using the first uplink beam according to the one or more parameter values.

By including or configuring the communications manager 1120 in accordance with examples as described herein, the device 1105 may support techniques for determining and communicating uplink beams for which a device (e.g., a UE) is capable of satisfying permissible exposure constraints in a given frequency band, which may result in improved safety standards for users, increased throughput and reliability of communications, and decreased system latency.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of maximum permissible exposure and grating lobes in wide bandwidth operations as described herein, or the processor 1140 and the memory 1130 may be otherwise configured to perform or support such operations.

Figure 12:
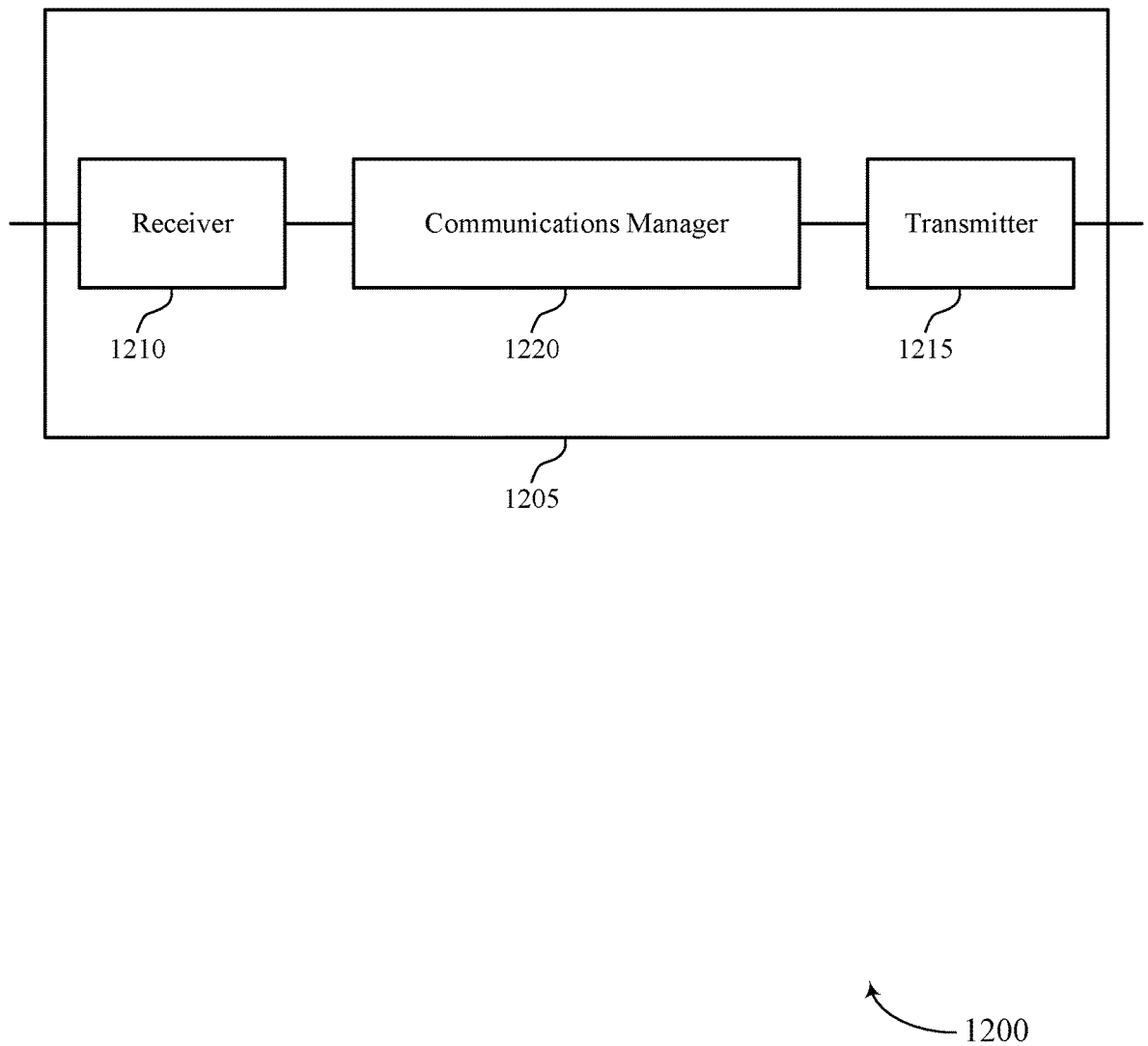
FIGS. 12 and 13 show block diagrams of devices that support permissible exposure and grating lobes in wide bandwidth operations in accordance with aspects of the present disclosure.

FIG. 12 shows a block diagram 1200 of a device 1205 that supports maximum permissible exposure and grating lobes in wide bandwidth operations in accordance with aspects of the present disclosure. The device 1205 may be an example of aspects of a base station 105 as described herein. The device 1205 may include a receiver 1210, a transmitter 1215, and a communications manager 1220. The device

1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to maximum permissible exposure and grating lobes in wide bandwidth operations). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to maximum permissible exposure and grating lobes in wide bandwidth operations). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of maximum permissible exposure and grating lobes in wide bandwidth operations as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting, to a UE, a report request message prompting the UE to report an uplink beam for a frequency band. The communications manager 1220 may be configured as or otherwise support a means for receiving, from the UE, a report indicating a first uplink beam for which the UE is capable of generating a main lobe and a grating lobe of the first uplink beam that each satisfy a permissible exposure constraint for the frequency band. The communications manager 1220 may be configured as or otherwise support a means for transmitting, to the UE, a control message scheduling the UE to transmit an uplink message within the frequency band. The communications manager 1220 may be configured as or otherwise support a means for receiving the uplink message within the frequency band using the first uplink beam.

Additionally, or alternatively, the communications manager 1220 may support wireless communications at a base station in accordance with examples as disclosed herein. For example, the communications manager 1220 may be configured as or otherwise support a means for transmitting, to a UE, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band. The communications manager 1220 may be configured as or otherwise support a means for receiving, from the UE, a report indicating the one or more parameter values for the first uplink beam. The communications manager 1220 may be configured as or otherwise support a means for transmitting, to the UE based on the report, a control message scheduling the UE to transmit an uplink message within the frequency band. The communications manager 1220 may be configured as or otherwise support a means for receiving, within the frequency band, the uplink message using the first uplink beam according to the one or more parameter values.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for determining and communicating uplink beams for which a device (e.g., a UE) is capable of satisfying permissible exposure constraints in a given frequency band, which may result in improved safety standards for users, increased throughput and reliability of communications, and decreased system latency.

Figure 13:
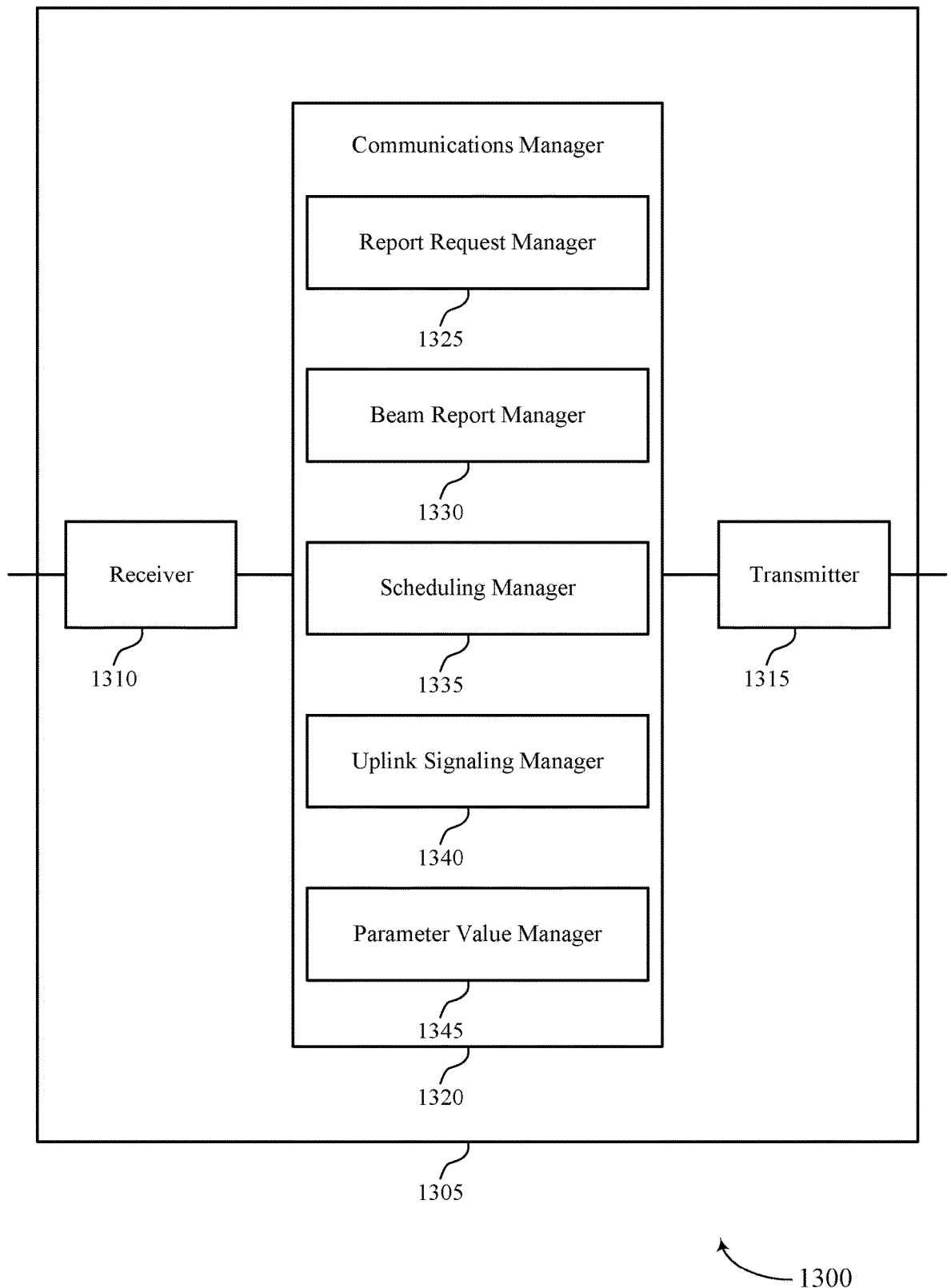

FIG. 13 shows a block diagram 1300 of a device 1305 that supports maximum permissible exposure and grating lobes in wide bandwidth operations in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to maximum permissible exposure and grating lobes in wide bandwidth operations). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to maximum permissible exposure and grating lobes in wide bandwidth operations). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of maximum permissible exposure and grating lobes in wide bandwidth operations as described herein. For example, the communications manager 1320 may include a report request manager 1325, a beam report manager 1330, a scheduling manager 1335, an uplink signaling manager 1340, a parameter value manager 1345, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The report request manager 1325 may be configured as or otherwise support a means for transmitting, to a UE, a report request message prompting the UE to report an uplink beam for a frequency band. The beam report manager 1330 may be configured as or otherwise support a means for receiving, from the UE, a report indicating a first uplink beam for which the UE is capable of generating a main lobe and a grating lobe of the first uplink beam that each satisfy a permissible exposure constraint for the frequency band. The scheduling manager 1335 may be configured as or otherwise support a means for transmitting, to the UE, a control message scheduling the UE to transmit an uplink message within the frequency band. The uplink signaling manager 1340 may be configured as or otherwise support a means for receiving the uplink message within the frequency band using the first uplink beam.

Additionally, or alternatively, the communications manager 1320 may support wireless communications at a base station in accordance with examples as disclosed herein. The report request manager 1325 may be configured as or otherwise support a means for transmitting, to a UE, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band. The parameter value manager 1345 may be configured as or otherwise support a means for receiving, from the UE, a report indicating the one or more parameter values for the first uplink beam. The scheduling manager 1335 may be configured as or otherwise support a means for transmitting, to the UE based on the report, a control message scheduling the UE to transmit an uplink message within the frequency band. The uplink signaling manager 1340 may be configured as or otherwise support a means for receiving, within the frequency band, the uplink message using the first uplink beam according to the one or more parameter values.

Figure 14:
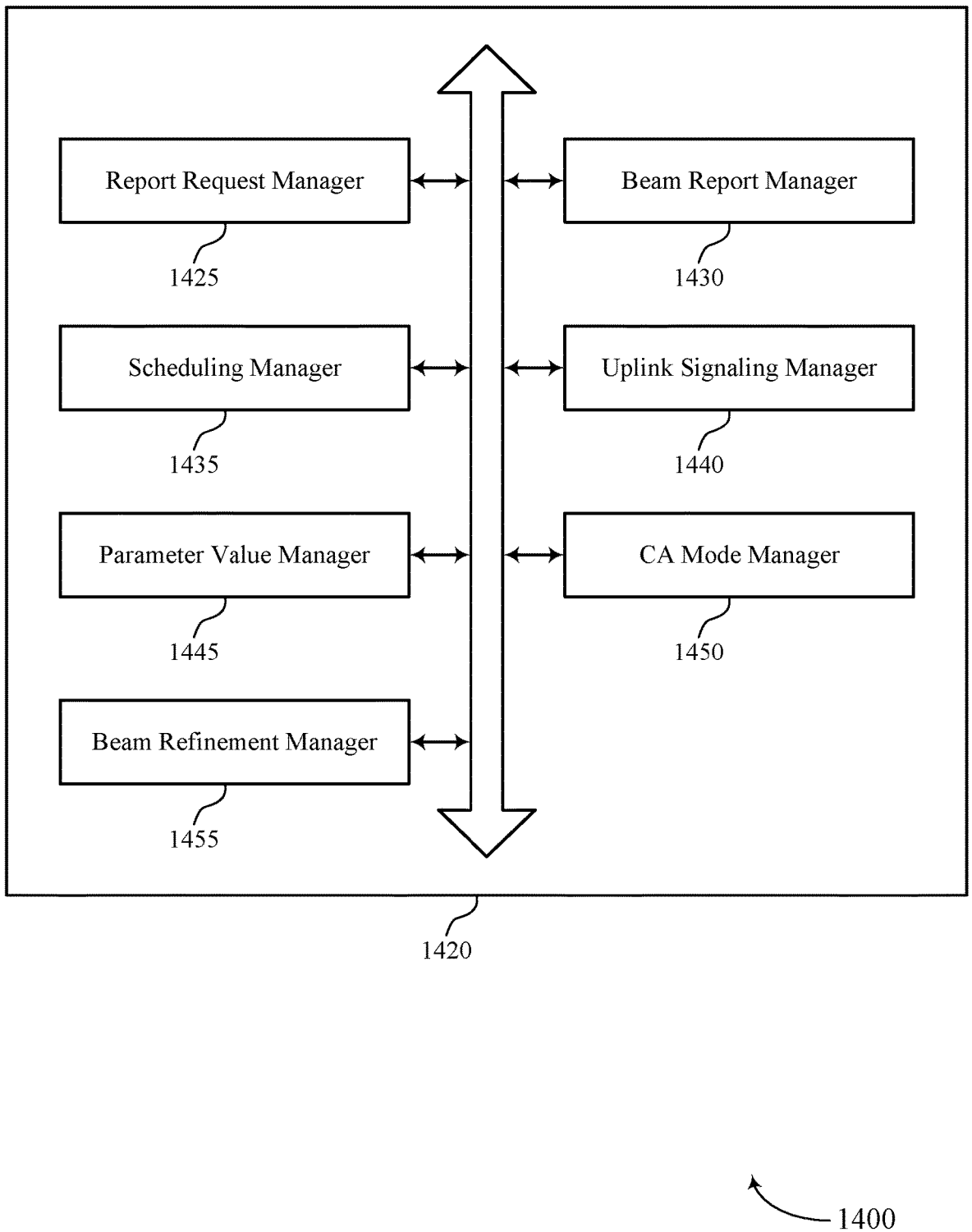
FIG. 14 shows a block diagram of a communications manager that supports permissible exposure and grating lobes in wide bandwidth operations in accordance with aspects of the present disclosure.

FIG. 14 shows a block diagram 1400 of a communications manager 1420 that supports maximum permissible exposure and grating lobes in wide bandwidth operations in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of maximum permissible exposure and grating lobes in wide bandwidth operations as described herein. For example, the communications manager 1420 may include a report request manager 1425, a beam report manager 1430, a scheduling manager 1435, an uplink signaling manager 1440, a parameter value manager 1445, a CA mode manager 1450, a beam refinement manager 1455, or any combination thereof. Each of these components may communicate, directly or indirectly, with one another (e.g., via one or more buses).

The communications manager 1420 may support wireless communications at a base station in accordance with examples as disclosed herein. The report request manager 1425 may be configured as or otherwise support a means for transmitting, to a UE, a report request message prompting the UE to report an uplink beam for a frequency band. The beam report manager 1430 may be configured as or otherwise support a means for receiving, from the UE, a report indicating a first uplink beam for which the UE is capable of generating a main lobe and a grating lobe of the first uplink beam that each satisfy a permissible exposure constraint for the frequency band. The scheduling manager 1435 may be configured as or otherwise support a means for transmitting, to the UE, a control message scheduling the UE to transmit an uplink message within the frequency band. The uplink signaling manager 1440 may be configured as or otherwise support a means for receiving the uplink message within the frequency band using the first uplink beam.

In some examples, to support receiving the report, the beam report manager 1430 may be configured as or otherwise support a means for receiving the report indicating the first uplink beam from a set of available uplink beams based on a magnitude of the grating lobe of the first uplink beam satisfying the permissible exposure constraint in a direction of the grating lobe that is a function of the frequency band.

In some examples, to support receiving the report, the beam report manager 1430 may be configured as or otherwise support a means for receiving the report indicating the first uplink beam from a set of available uplink beams based on a magnitude of the main lobe of the first uplink beam satisfying the permissible exposure constraint in a direction of the first uplink beam.

In some examples, the CA mode manager 1450 may be configured as or otherwise support a means for transmitting, to the UE, control signaling configuring the UE to operate in a carrier aggregation mode for a set of multiple frequency bands including the frequency band. In some examples, the CA mode manager 1450 may be configured as or otherwise support a means for receiving the report indicating one or more uplink beams for which the UE is capable of generating a respective main lobe and a respective grating lobe that each satisfy a permissible exposure constraint in a respective frequency band of the set of multiple frequency bands.

In some examples, to support receiving the report, the beam report manager 1430 may be configured as or otherwise support a means for receiving the report indicating a second uplink beam for which the UE is capable of generating a second main lobe and a second grating lobe of the second uplink beam that each satisfy a permissible exposure constraint for a second frequency band of the set of multiple frequency bands.

In some examples, to support receiving the report, the beam report manager 1430 may be configured as or otherwise support a means for receiving the report indicating the first uplink beam for which the UE is capable of generating the main lobe and the grating lobe of the first uplink beam that each satisfy a permissible exposure constraint for a second frequency band.

In some examples, to support receiving the report, the beam report manager 1430 may be configured as or otherwise support a means for receiving the report indicating the first uplink beam for which the UE is capable of generating the main lobe and the grating lobe of the first uplink beam that each satisfy a permissible exposure constraint for a subset of the set of multiple frequency bands.

In some examples, the beam refinement manager 1455 may be configured as or otherwise support a means for transmitting, to the UE, control signaling initiating a beam refinement procedure for multiple frequency bands of the set of multiple frequency bands for the carrier aggregation mode. In some examples, the beam report manager 1430 may be configured as or otherwise support a means for receiving the report indicating one or more uplink beams for which the UE is capable of generating a respective main lobe and a respective grating lobe that each satisfy a permissible exposure constraint in a respective frequency band of the multiple frequency bands based on the control signaling.

Additionally, or alternatively, the communications manager 1420 may support wireless communications at a base station in accordance with examples as disclosed herein. In some examples, the report request manager 1425 may be configured as or otherwise support a means for transmitting, to a UE, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band. The parameter value manager 1445 may be configured as or otherwise support a means for receiving, from the UE, a report indicating the one or more parameter values for the first uplink beam. In some examples, the scheduling manager 1435 may be configured as or otherwise support a means for transmitting, to the UE based on the report, a control message scheduling the UE to transmit an uplink message within the frequency band. In some examples, the uplink signaling manager 1440 may be configured as or otherwise support a means for receiving, within the frequency band, the uplink message using the first uplink beam according to the one or more parameter values.

In some examples, the report request manager 1425 may be configured as or otherwise support a means for transmitting the report request indicating a set of multiple uplink beams. In some examples, the beam report manager 1430 may be configured as or otherwise support a means for receiving the report indicating the one or more parameter values for each uplink beam of the set of multiple uplink beams.

In some examples, the report request manager 1425 may be configured as or otherwise support a means for transmitting the report request message indicating a second frequency band, the report prompting the UE to report one or more second parameter values for the first uplink beam for which the UE is capable of generating, using the one or more parameter values, a main lobe and a grating lobe of the first uplink beam that each satisfy a permissible exposure constraint for the second frequency band. In some examples, the beam report manager 1430 may be configured as or otherwise support a means for receiving, from the UE, the report indicating the one or more second parameter values for the first uplink beam. In some examples, the scheduling manager 1435 may be configured as or otherwise support a means for transmitting, to the UE based on the report, the control message scheduling the UE to transmit a second uplink message within the second frequency band. In some examples, the uplink signaling manager 1440 may be configured as or otherwise support a means for receiving, within the second frequency band, the second uplink message using the first uplink beam according to the one or more second parameter values.

In some examples, the report request manager 1425 may be configured as or otherwise support a means for transmitting the report request message indicating a second uplink beam, the report prompting the UE to report one or more second parameter values for the second uplink beam for which the UE is capable of generating, using the one or more parameter values, a main lobe and a grating lobe of the second uplink beam that each satisfy a permissible exposure constraint for the frequency band. In some examples, the beam report manager 1430 may be configured as or otherwise support a means for receiving, from the UE, the report indicating the one or more second parameter values for the second uplink beam. In some examples, the scheduling manager 1435 may be configured as or otherwise support a means for transmitting, to the UE based on the report, the control message scheduling the UE to transmit a second uplink message within the frequency band. In some examples, the uplink signaling manager 1440 may be configured as or otherwise support a means for receiving, within the frequency band, the second uplink message using the second uplink beam according to the one or more second parameter values.

Figure 15:
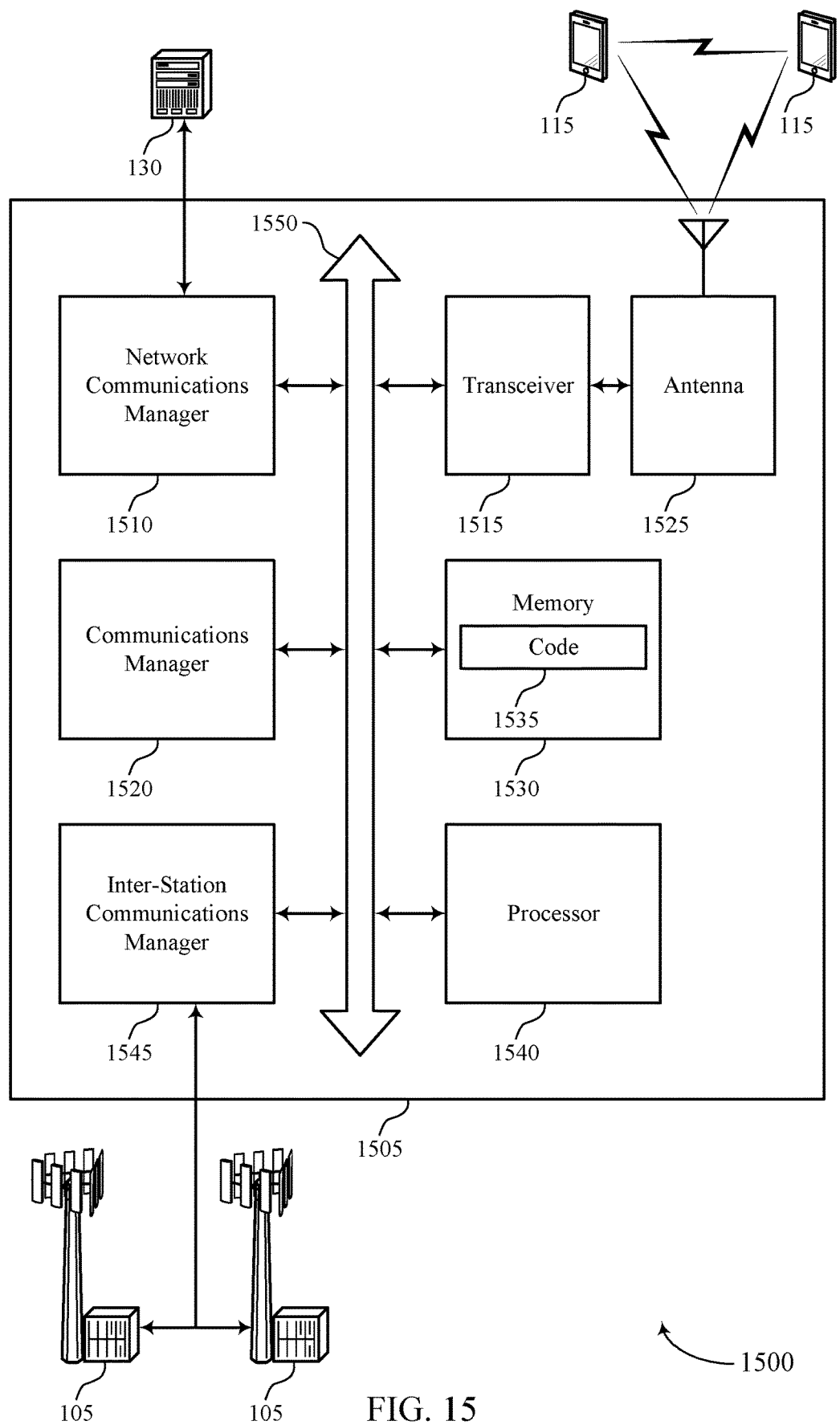
FIG. 15 shows a diagram of a system including a device that supports permissible exposure and grating lobes in wide bandwidth operations in accordance with aspects of the present disclosure.

FIG. 15 shows a diagram of a system 1500 including a device 1505 that supports maximum permissible exposure and grating lobes in wide bandwidth operations in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting maximum permissible exposure and grating lobes in wide bandwidth operations). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting, to a UE, a report request message prompting the UE to report an uplink beam for a frequency band. The communications manager 1520 may be configured as or otherwise support a means for receiving, from the UE, a report indicating a first uplink beam for which the UE is capable of generating a main lobe and a grating lobe of the first uplink beam that each satisfy a permissible exposure constraint for the frequency band. The communications manager 1520 may be configured as or otherwise support a means for transmitting, to the UE, a control message scheduling the UE to transmit an uplink message within the frequency band. The communications manager 1520 may be configured as or otherwise support a means for receiving the uplink message within the frequency band using the first uplink beam.

Additionally or alternatively, the communications manager 1520 may support wireless communications at a base station in accordance with examples as disclosed herein. For example, the communications manager 1520 may be configured as or otherwise support a means for transmitting, to a UE, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band. The communications manager 1520 may be configured as or otherwise support a means for receiving, from the UE, a report indicating the one or more parameter values for the first uplink beam. The communications manager 1520 may be configured as or otherwise support a means for transmitting, to the UE based on the report, a control message scheduling the UE to transmit an uplink message within the frequency band. The communications manager 1520 may be configured as or otherwise support a means for receiving, within the frequency band, the uplink message using the first uplink beam according to the one or more parameter values.

By including or configuring the communications manager 1520 in accordance with examples as described herein, the device 1505 may support techniques for determining and communicating uplink beams for which a device (e.g., a UE) is capable of satisfying permissible exposure constraints in a given frequency band, which may result in improved safety standards for users, increased throughput and reliability of communications, and decreased system latency.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of maximum permissible exposure and grating lobes in wide bandwidth operations as described herein, or the processor 1540 and the memory 1530 may be otherwise configured to perform or support such operations.

Figure 16:
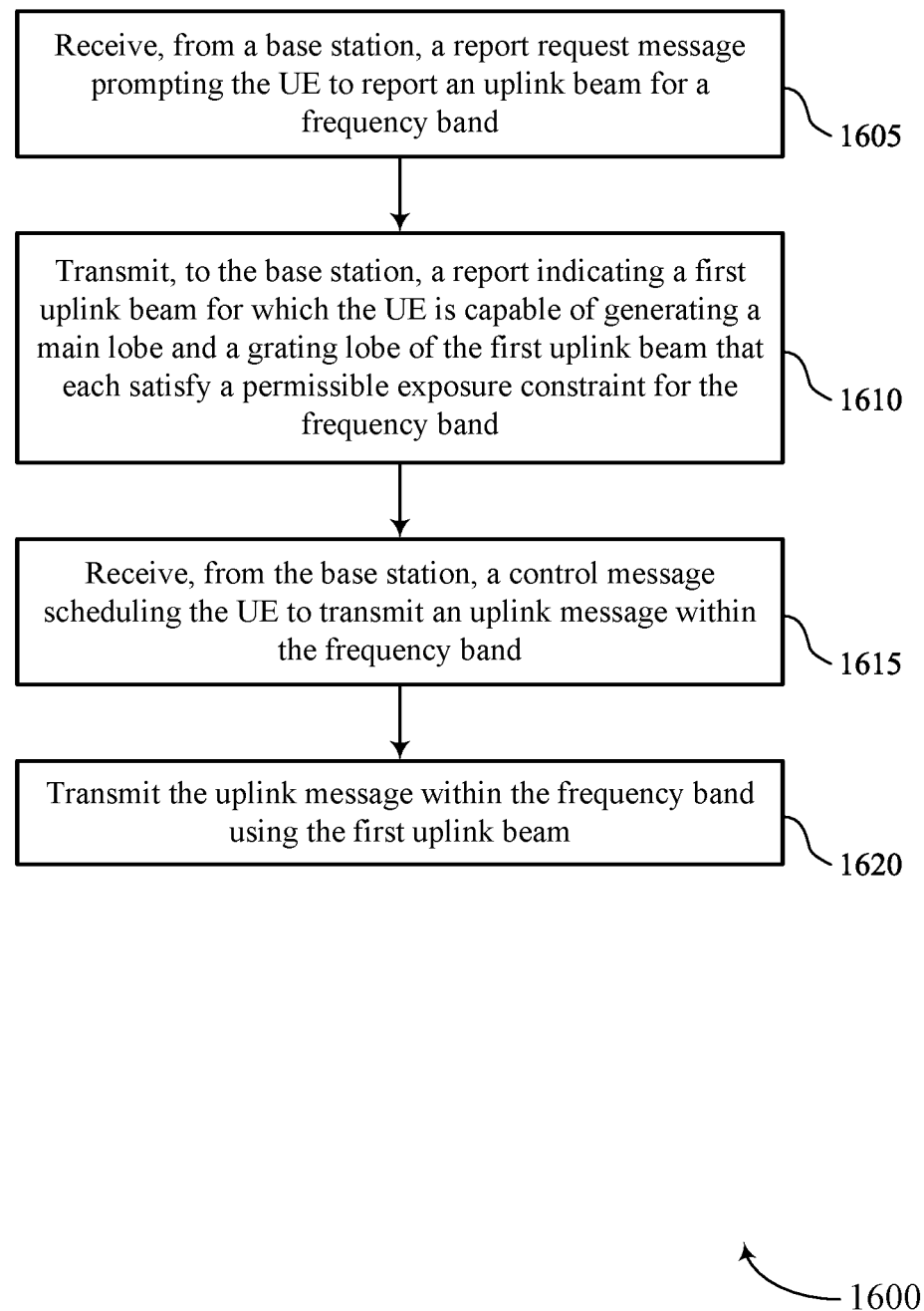
FIGS. 16 through 19 show flowcharts illustrating methods that support permissible exposure and grating lobes in wide bandwidth operations in accordance with aspects of the present disclosure.

FIG. 16 shows a flowchart illustrating a method 1600 that supports maximum permissible exposure and grating lobes in wide bandwidth operations in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, a report request message prompting the UE to report an uplink beam for a frequency band. The operations of 1605 may be performed in accordance with examples as disclosed herein. In some examples, aspects of the operations of 1605 may be performed by a report request manager 1025 as described with reference to FIG. 10.

At 1610, the method may include transmitting, to the base station, a report indicating a first uplink beam for which the UE is capable of generating a main lobe and a grating lobe of the first uplink beam that each satisfy a permissible exposure constraint for the frequency band. The operations of 1610 may be performed in accordance with examples as disclosed herein. In some examples, aspects of the operations of 1610 may be performed by a beam report manager 1030 as described with reference to FIG. 10.

At 1615, the method may include receiving, from the base station, a control message scheduling the UE to transmit an uplink message within the frequency band. The operations of 1615 may be performed in accordance with examples as disclosed herein. In some examples, aspects of the operations of 1615 may be performed by a scheduling manager 1035 as described with reference to FIG. 10.

At 1620, the method may include transmitting the uplink message within the frequency band using the first uplink beam. The operations of 1620 may be performed in accordance with examples as disclosed herein. In some examples, aspects of the operations of 1620 may be performed by an uplink signaling manager 1040 as described with reference to FIG. 10.

Figure 17:
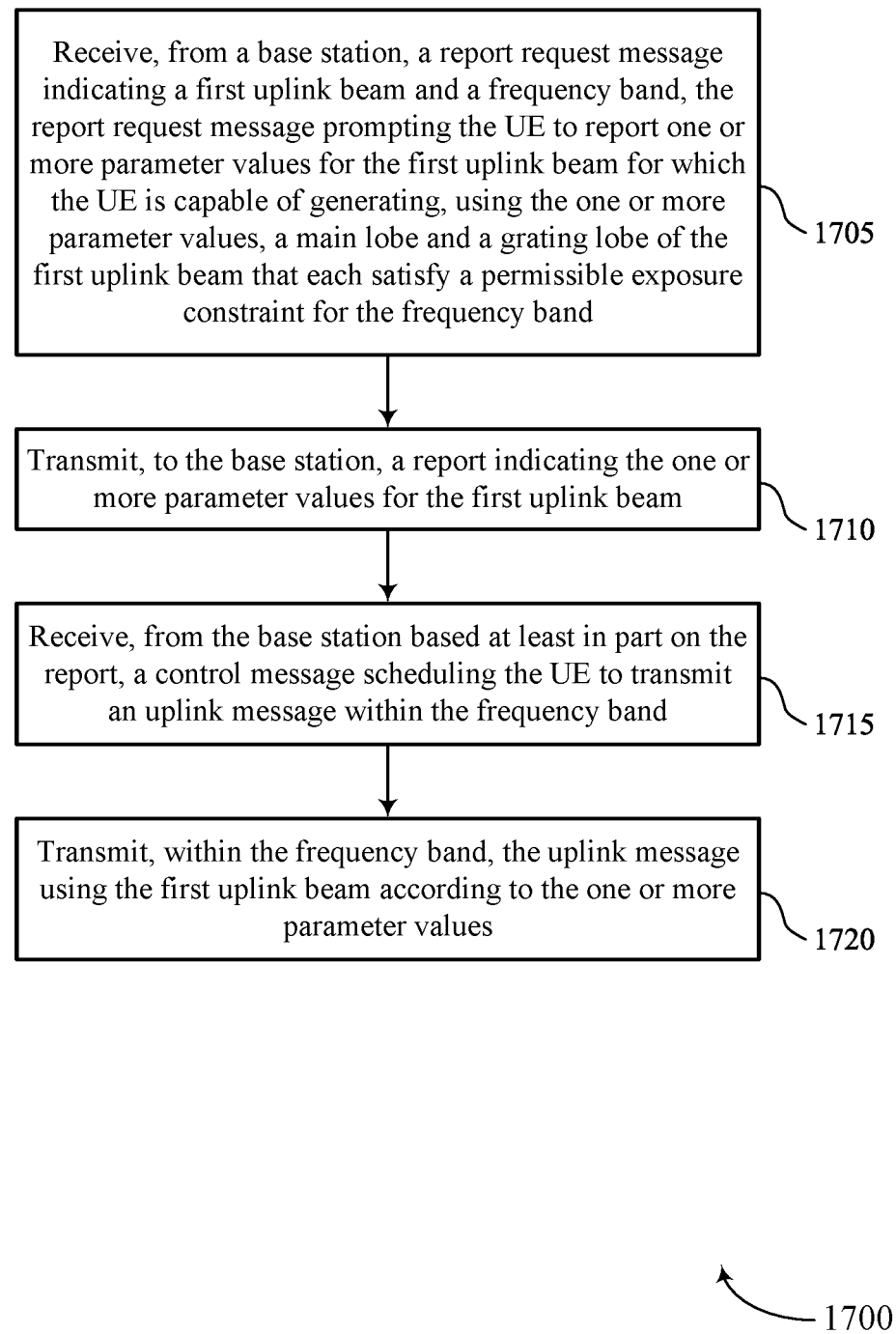

FIG. 17 shows a flowchart illustrating a method 1700 that supports maximum permissible exposure and grating lobes in wide bandwidth operations in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving, from a base station, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band. The operations of 1705 may be performed in accordance with examples as disclosed herein. In some examples, aspects of the operations of 1705 may be performed by a report request manager 1025 as described with reference to FIG. 10.

At 1710, the method may include transmitting, to the base station, a report indicating the one or more parameter values for the first uplink beam. The operations of 1710 may be performed in accordance with examples as disclosed herein. In some examples, aspects of the operations of 1710 may be performed by a parameter value manager 1045 as described with reference to FIG. 10.

At 1715, the method may include receiving, from the base station based on the report, a control message scheduling the UE to transmit an uplink message within the frequency band. The operations of 1715 may be performed in accordance with examples as disclosed herein. In some examples, aspects of the operations of 1715 may be performed by a scheduling manager 1035 as described with reference to FIG. 10.

At 1720, the method may include transmitting, within the frequency band, the uplink message using the first uplink beam according to the one or more parameter values. The operations of 1720 may be performed in accordance with examples as disclosed herein. In some examples, aspects of the operations of 1720 may be performed by an uplink signaling manager 1040 as described with reference to FIG. 10.

Figure 18:
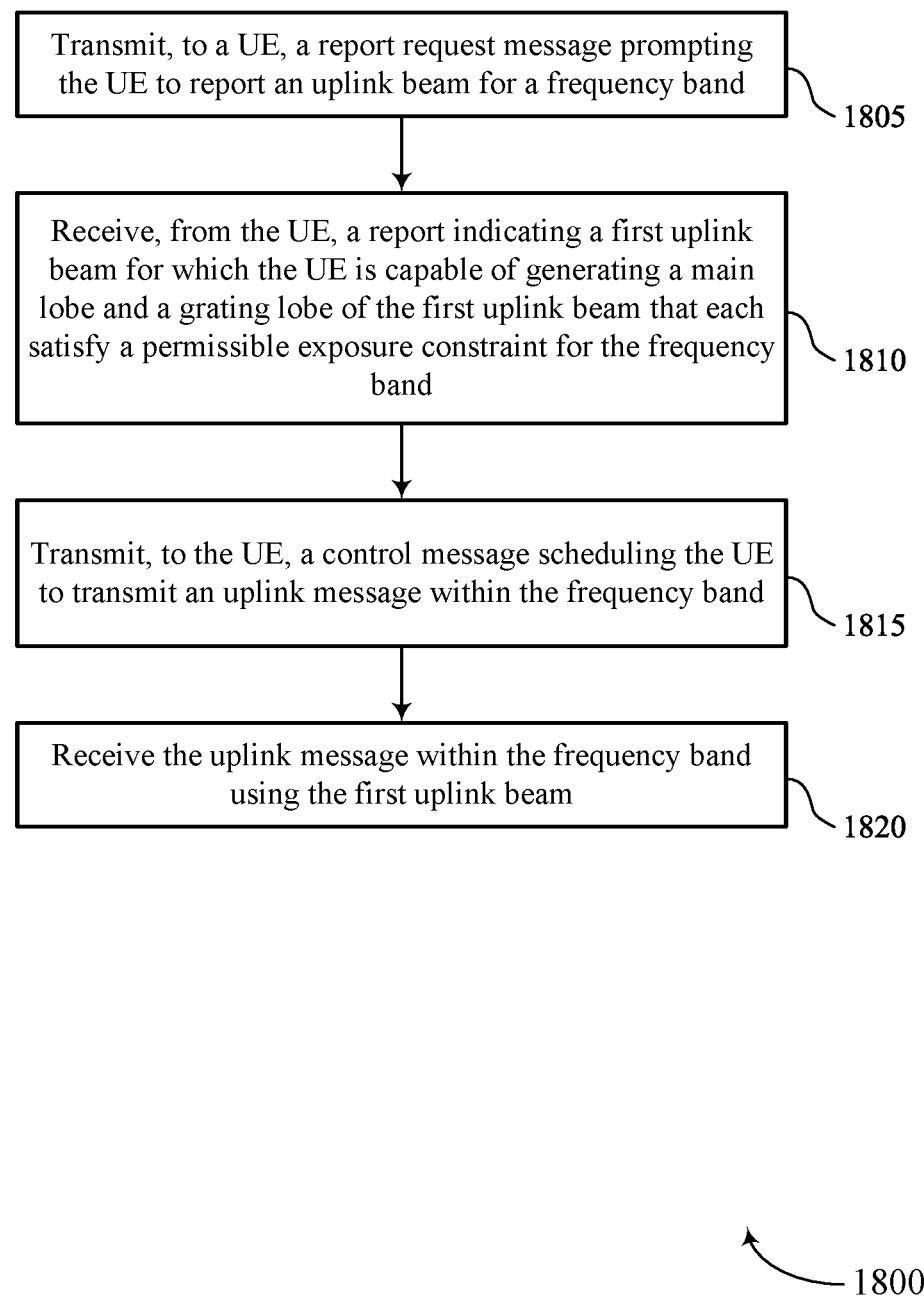

FIG. 18 shows a flowchart illustrating a method 1800 that supports maximum permissible exposure and grating lobes in wide bandwidth operations in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1805, the method may include transmitting, to a UE, a report request message prompting the UE to report an uplink beam for a frequency band. The operations of 1805 may be performed in accordance with examples as disclosed herein. In some examples, aspects of the operations of 1805 may be performed by a report request manager 1425 as described with reference to FIG. 14.

At 1810, the method may include receiving, from the UE, a report indicating a first uplink beam for which the UE is capable of generating a main lobe and a grating lobe of the first uplink beam that each satisfy a permissible exposure constraint for the frequency band. The operations of 1810 may be performed in accordance with examples as disclosed herein. In some examples, aspects of the operations of 1810 may be performed by a beam report manager 1430 as described with reference to FIG. 14.

At 1815, the method may include transmitting, to the UE, a control message scheduling the UE to transmit an uplink message within the frequency band. The operations of 1815 may be performed in accordance with examples as disclosed herein. In some examples, aspects of the operations of 1815 may be performed by a scheduling manager 1435 as described with reference to FIG. 14.

At 1820, the method may include receiving the uplink message within the frequency band using the first uplink beam. The operations of 1820 may be performed in accordance with examples as disclosed herein. In some examples, aspects of the operations of 1820 may be performed by an uplink signaling manager 1440 as described with reference to FIG. 14.

Figure 19:
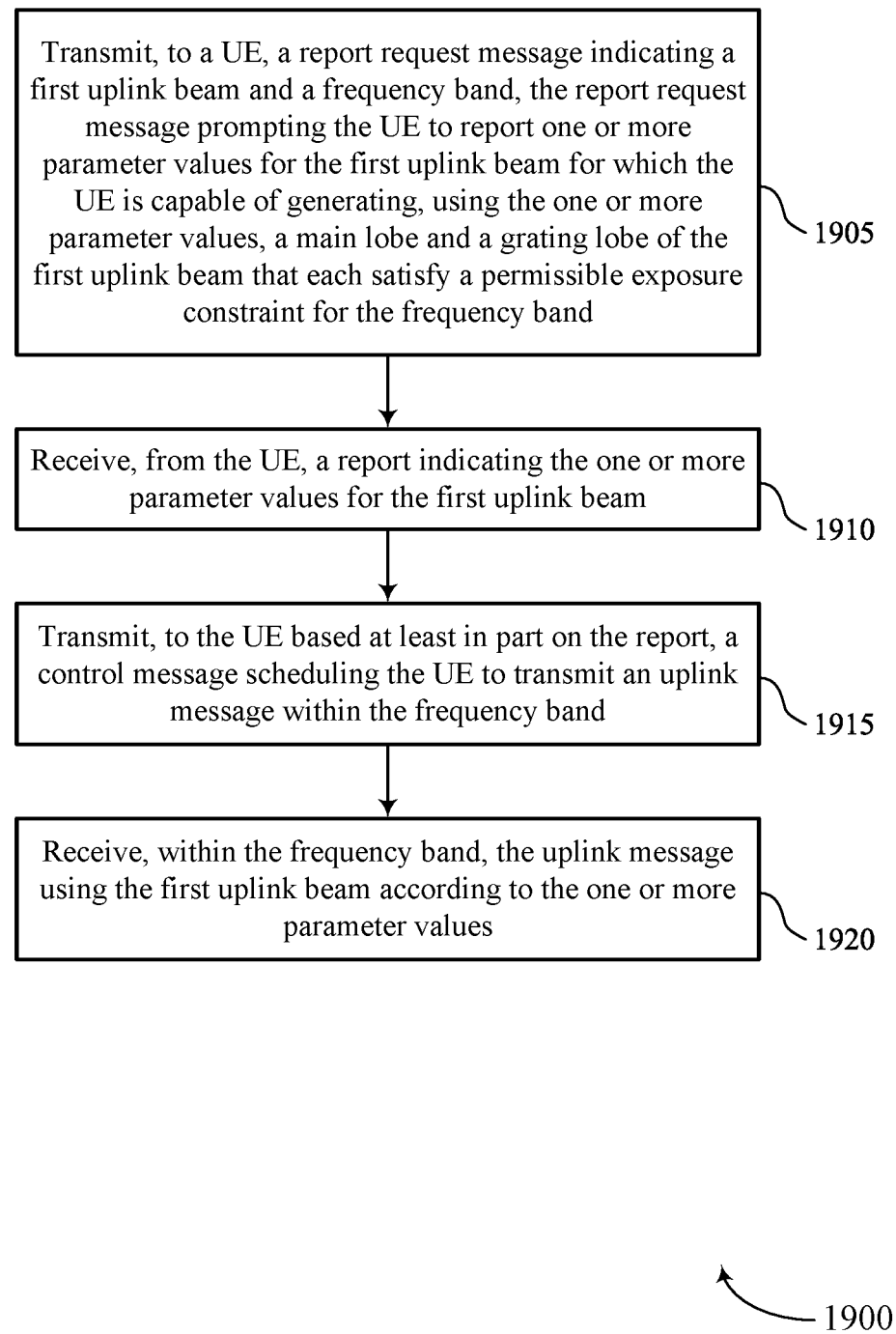

FIG. 19 shows a flowchart illustrating a method 1900 that supports maximum permissible exposure and grating lobes in wide bandwidth operations in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1905, the method may include transmitting, to a UE, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band. The operations of 1905 may be performed in accordance with examples as disclosed herein. In some examples, aspects of the operations of 1905 may be performed by a report request manager 1425 as described with reference to FIG. 14.

At 1910, the method may include receiving, from the UE, a report indicating the one or more parameter values for the first uplink beam. The operations of 1910 may be performed in accordance with examples as disclosed herein. In some examples, aspects of the operations of 1910 may be performed by a parameter value manager 1445 as described with reference to FIG. 14.

At 1915, the method may include transmitting, to the UE based on the report, a control message scheduling the UE to transmit an uplink message within the frequency band. The operations of 1915 may be performed in accordance with examples as disclosed herein. In some examples, aspects of the operations of 1915 may be performed by a scheduling manager 1435 as described with reference to FIG. 14.

At 1920, the method may include receiving, within the frequency band, the uplink message using the first uplink beam according to the one or more parameter values. The operations of 1920 may be performed in accordance with examples as disclosed herein. In some examples, aspects of the operations of 1920 may be performed by an uplink signaling manager 1440 as described with reference to FIG. 14.

The following provides an overview of aspects of the present disclosure:

Aspect 1: A method for wireless communications at a UE, comprising: receiving, from a base station, a report request message prompting the UE to report an uplink beam for a frequency band; transmitting, to the base station, a report indicating a first uplink beam for which the UE is capable of generating a main lobe and a grating lobe of the first uplink beam that each satisfy a permissible exposure constraint for the frequency band; receiving, from the base station, a control message scheduling the UE to transmit an uplink message within the frequency band; and transmitting the uplink message within the frequency band using the first uplink beam.

Aspect 2: The method of aspect 1, wherein transmitting the report further comprises: transmitting the report indicating the first uplink beam from a set of available uplink beams based at least in part on a magnitude of the grating lobe of the first uplink beam satisfying the permissible exposure constraint in a direction of the grating lobe that is a function of the frequency band.

Aspect 3: The method of any of aspects 1 through 2, wherein transmitting the report further comprises: transmitting the report indicating the first uplink beam from a set of available uplink beams based at least in part on a magnitude of the main lobe of the first uplink beam satisfying the permissible exposure constraint in a direction of the first uplink beam.

Aspect 4: The method of any of aspects 1 through 3, further comprising: receiving, from the base station, control signaling configuring the UE to operate in a carrier aggregation mode for a plurality of frequency bands comprising the frequency band; and transmitting the report indicating one or more uplink beams for which the UE is capable of generating a respective main lobe and a respective grating lobe that each satisfy a permissible exposure constraint in a respective frequency band of the plurality of frequency bands.

Aspect 5: The method of aspect 4, wherein transmitting the report comprises: transmitting the report indicating a second uplink beam for which the UE is capable of generating a second main lobe and a second grating lobe of the second uplink beam that each satisfy a permissible exposure constraint for a second frequency band of the plurality of frequency bands.

Aspect 6: The method of any of aspects 4 through 5, wherein transmitting the report comprises: transmitting the report indicating the first uplink beam for which the UE is capable of generating the main lobe and the grating lobe of the first uplink beam that each satisfy a permissible exposure constraint for a second frequency band.

Aspect 7: The method of any of aspects 4 through 6, wherein transmitting the report comprises: transmitting, to the base station, the report indicating the first uplink beam for which the UE is capable of generating the main lobe and the grating lobe of the first uplink beam that each satisfy a permissible exposure constraint for a subset of the plurality of frequency bands.

Aspect 8: The method of any of aspects 4 through 7, further comprising: receiving, from the base station, control signaling initiating a beam refinement procedure for multiple frequency bands of the plurality of frequency bands for the carrier aggregation mode; and transmitting the report indicating one or more uplink beams for which the UE is capable of generating a respective main lobe and a respective grating lobe that each satisfy a permissible exposure constraint in a respective frequency band of the multiple frequency bands based at least in part on the control signaling.

Aspect 9: The method of aspect 8, wherein the first uplink beam is reciprocal to a downlink beam determined for the frequency band in the beam refinement procedure.

Aspect 10: The method of any of aspects 8 through 9, wherein the first uplink beam is not reciprocal to a downlink beam determined for the frequency band in the beam refinement procedure.

Aspect 11: The method of any of aspects 4 through 10, wherein the carrier aggregation mode comprises an inter-band carrier aggregation mode or an intra-band carrier aggregation mode.

Aspect 12: The method of any of aspects 1 through 11, wherein transmitting the report comprises: transmitting the report comprising a transmission configuration indicator state of the first uplink beam.

Aspect 13: A method for wireless communications at a UE, comprising: receiving, from a base station, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band; transmitting, to the base station, a report indicating the one or more parameter values for the first uplink beam; receiving, from the base station based at least in part on the report, a control message scheduling the UE to transmit an uplink message within the frequency band; and transmitting, within the frequency band, the uplink message using the first uplink beam according to the one or more parameter values.

Aspect 14: The method of aspect 13, further comprising: receiving the report request indicating a plurality of uplink beams; and transmitting the report indicating respective one or more parameter values for each uplink beam of the plurality of uplink beams.

Aspect 15: The method of any of aspects 13 through 14, further comprising: receiving the report request message indicating a second frequency band, the report prompting the UE to report one or more second parameter values for the first uplink beam for which the UE is capable of generating, using the one or more parameter values, a main lobe and a grating lobe of the first uplink beam that each satisfy a permissible exposure constraint for the second frequency band; transmitting, to the base station, the report indicating the one or more second parameter values for the first uplink beam; receiving, from the base station based at least in part on the report, the control message scheduling the UE to transmit a second uplink message within the second frequency band; and transmitting, within the second frequency band, the second uplink message using the first uplink beam according to the one or more second parameter values.

Aspect 16: The method of any of aspects 13 through 15, further comprising: receiving the report request message indicating a second uplink beam, the report prompting the UE to report one or more second parameter values for the second uplink beam for which the UE is capable of generating, using the one or more parameter values, a main lobe and a grating lobe of the second uplink beam that each satisfy a permissible exposure constraint for the frequency band; transmitting, to the base station, the report indicating the one or more second parameter values for the second uplink beam; receiving, from the base station based at least in part on the report, the control message scheduling the UE to transmit a second uplink message within the frequency band; and transmitting, within the frequency band, the second uplink message using the second uplink beam according to the one or more second parameter values.

Aspect 17: The method of any of aspects 13 through 16, wherein receiving the report request message comprises: receiving the report request message indicating a transmission configuration state of the first uplink beam.

Aspect 18: The method of any of aspects 13 through 17, wherein transmitting the report comprises: transmitting the report indicating the one or more parameter values comprising a permissible exposure threshold, a permissible exposure timer, an indication of the frequency band, a power backoff value, or any combination thereof, for the first uplink beam.

Aspect 19: A method for wireless communications at a base station, comprising: transmitting, to a UE, a report request message prompting the UE to report an uplink beam for a frequency band; receiving, from the UE, a report indicating a first uplink beam for which the UE is capable of generating a main lobe and a grating lobe of the first uplink beam that each satisfy a permissible exposure constraint for the frequency band; transmitting, to the UE, a control message scheduling the UE to transmit an uplink message within the frequency band; and receiving the uplink message within the frequency band using the first uplink beam.

Aspect 20: The method of aspect 19, wherein receiving the report comprises: receiving the report indicating the first uplink beam from a set of available uplink beams based at least in part on a magnitude of the grating lobe of the first uplink beam satisfying the permissible exposure constraint in a direction of the grating lobe that is a function of the frequency band.

Aspect 21: The method of any of aspects 19 through 20, wherein receiving the report comprises: receiving the report indicating the first uplink beam from a set of available uplink beams based at least in part on a magnitude of the main lobe of the first uplink beam satisfying the permissible exposure constraint in a direction of the first uplink beam.

Aspect 22: The method of any of aspects 19 through 21, further comprising: transmitting, to the UE, control signaling configuring the UE to operate in a carrier aggregation mode for a plurality of frequency bands comprising the frequency band; and receiving the report indicating one or more uplink beams for which the UE is capable of generating a respective main lobe and a respective grating lobe that each satisfy a permissible exposure constraint in a respective frequency band of the plurality of frequency bands.

Aspect 23: The method of aspect 22, wherein receiving the report comprises: receiving the report indicating a second uplink beam for which the UE is capable of generating a second main lobe and a second grating lobe of the second uplink beam that each satisfy a permissible exposure constraint for a second frequency band of the plurality of frequency bands.

Aspect 24: The method of any of aspects 22 through 23, wherein receiving the report comprises: receiving the report indicating the first uplink beam for which the UE is capable of generating the main lobe and the grating lobe of the first uplink beam that each satisfy a permissible exposure constraint for a second frequency band.

Aspect 25: The method of any of aspects 22 through 24, wherein receiving the report comprises: receiving the report indicating the first uplink beam for which the UE is capable of generating the main lobe and the grating lobe of the first uplink beam that each satisfy a permissible exposure constraint for a subset of the plurality of frequency bands.

Aspect 26: The method of any of aspects 22 through 25, further comprising: transmitting, to the UE, control signaling initiating a beam refinement procedure for multiple frequency bands of the plurality of frequency bands for the carrier aggregation mode; and receiving the report indicating one or more uplink beams for which the UE is capable of generating a respective main lobe and a respective grating lobe that each satisfy a permissible exposure constraint in a respective frequency band of the multiple frequency bands based at least in part on the control signaling.

Aspect 27: A method for wireless communications at a base station, comprising: transmitting, to a UE, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band; receiving, from the UE, a report indicating the one or more parameter values for the first uplink beam; transmitting, to the UE based at least in part on the report, a control message scheduling the UE to transmit an uplink message within the frequency band; and receiving, within the frequency band, the uplink message using the first uplink beam according to the one or more parameter values.

Aspect 28: The method of aspect 27, further comprising: transmitting the report request indicating a plurality of uplink beams; and receiving the report indicating the one or more parameter values for each uplink beam of the plurality of uplink beams.

Aspect 29: The method of any of aspects 27 through 28, further comprising: transmitting the report request message indicating a second frequency band, the report prompting the UE to report one or more second parameter values for the first uplink beam for which the UE is capable of generating, using the one or more parameter values, a main lobe and a grating lobe of the first uplink beam that each satisfy a permissible exposure constraint for the second frequency band; receiving, from the UE, the report indicating the one or more second parameter values for the first uplink beam; transmitting, to the UE based at least in part on the report, the control message scheduling the UE to transmit a second uplink message within the second frequency band; and receiving, within the second frequency band, the second uplink message using the first uplink beam according to the one or more second parameter values.

Aspect 30: The method of any of aspects 27 through 29, further comprising: transmitting the report request message indicating a second uplink beam, the report prompting the UE to report one or more second parameter values for the second uplink beam for which the UE is capable of generating, using the one or more parameter values, a main lobe and a grating lobe of the second uplink beam that each satisfy a permissible exposure constraint for the frequency band; receiving, from the UE, the report indicating the one or more second parameter values for the second uplink beam; transmitting, to the UE based at least in part on the report, the control message scheduling the UE to transmit a second uplink message within the frequency band; and receiving, within the frequency band, the second uplink message using the second uplink beam according to the one or more second parameter values.

Aspect 31: An apparatus for wireless communications at a UE, comprising a processor; memory coupled with the processor; and instructions stored in the memory and executable by the processor to cause the apparatus to perform a method of any of aspects 1 through 12.

Aspect 32: An apparatus for wireless communications at a UE, comprising at least one means for performing a method of any of aspects 1 through 12.

Aspect 33: A non-transitory computer-readable medium storing code for wireless communications at a UE, the code comprising instructions executable by a processor to perform a method of any of aspects 1 through 12.

Aspect 34: An apparatus for wireless communications at a UE, comprising a processor; memory coupled with the processor; and instructions stored in the memory and executable by the processor to cause the apparatus to perform a method of any of aspects 13 through 18.

Aspect 35: An apparatus for wireless communications at a UE, comprising at least one means for performing a method of any of aspects 13 through 18.

Aspect 36: A non-transitory computer-readable medium storing code for wireless communications at a UE, the code comprising instructions executable by a processor to perform a method of any of aspects 13 through 18.

Aspect 37: An apparatus for wireless communications at a base station, comprising a processor; memory coupled with the processor; and instructions stored in the memory and executable by the processor to cause the apparatus to perform a method of any of aspects 19 through 26.

Aspect 38: An apparatus for wireless communications at a base station, comprising at least one means for performing a method of any of aspects 19 through 26.

Aspect 39: A non-transitory computer-readable medium storing code for wireless communications at a base station, the code comprising instructions executable by a processor to perform a method of any of aspects 19 through 26.

Aspect 40: An apparatus for wireless communications at a base station, comprising a processor; memory coupled with the processor; and instructions stored in the memory and executable by the processor to cause the apparatus to perform a method of any of aspects 27 through 30.

Aspect 41: An apparatus for wireless communications at a base station, comprising at least one means for performing a method of any of aspects 27 through 30.

Aspect 42: A non-transitory computer-readable medium storing code for wireless communications at a base station, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, a report request message prompting the UE to report an uplink beam for a frequency band;
   transmitting, to the base station, a report indicating a first uplink beam for which the UE is capable of generating a main lobe and a grating lobe of the first uplink beam that each satisfy a permissible exposure constraint for the frequency band;
   receiving, from the base station, a control message scheduling the UE to transmit an uplink message within the frequency band; and
   transmitting the uplink message within the frequency band using the first uplink beam.

2. The method of claim 1, wherein transmitting the report further comprises:
   transmitting the report indicating the first uplink beam from a set of available uplink beams based at least in part on a magnitude of the grating lobe of the first uplink beam satisfying the permissible exposure constraint in a direction of the grating lobe that is a function of the frequency band.

3. The method of claim 1, wherein transmitting the report further comprises:
   transmitting the report indicating the first uplink beam from a set of available uplink beams based at least in part on a magnitude of the main lobe of the first uplink beam satisfying the permissible exposure constraint in a direction of the first uplink beam.

4. The method of claim 1, further comprising:
receiving, from the base station, control signaling configuring the UE to operate in a carrier aggregation mode for a plurality of frequency bands comprising the frequency band; and
transmitting the report indicating one or more uplink beams for which the UE is capable of generating a respective main lobe and a respective grating lobe that each satisfy a permissible exposure constraint in a respective frequency band of the plurality of frequency bands.

5. The method of claim 4, wherein transmitting the report comprises:
transmitting the report indicating a second uplink beam for which the UE is capable of generating a second main lobe and a second grating lobe of the second uplink beam that each satisfy a permissible exposure constraint for a second frequency band of the plurality of frequency bands.

6. The method of claim 4, wherein transmitting the report comprises:
transmitting the report indicating the first uplink beam for which the UE is capable of generating the main lobe and the grating lobe of the first uplink beam that each satisfy a permissible exposure constraint for a second frequency band.

7. The method of claim 4, wherein transmitting the report comprises:
transmitting, to the base station, the report indicating the first uplink beam for which the UE is capable of generating the main lobe and the grating lobe of the first uplink beam that each satisfy a permissible exposure constraint for a subset of the plurality of frequency bands.

8. The method of claim 4, further comprising:
receiving, from the base station, control signaling initiating a beam refinement procedure for multiple frequency bands of the plurality of frequency bands for the carrier aggregation mode; and
transmitting the report indicating one or more uplink beams for which the UE is capable of generating a respective main lobe and a respective grating lobe that each satisfy a permissible exposure constraint in a respective frequency band of the multiple frequency bands based at least in part on the control signaling.

9. The method of claim 8, wherein the first uplink beam is reciprocal to a downlink beam determined for the frequency band in the beam refinement procedure.

10. The method of claim 8, wherein the first uplink beam is not reciprocal to a downlink beam determined for the frequency band in the beam refinement procedure.

11. The method of claim 4, wherein the carrier aggregation mode comprises an inter-band carrier aggregation mode or an intra-band carrier aggregation mode.

12. The method of claim 1, wherein transmitting the report comprises:
transmitting the report comprising a transmission configuration indicator state of the first uplink beam.

13. A method for wireless communications at a user equipment (UE), comprising:
receiving, from a base station, a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band;
transmitting, to the base station, a report indicating the one or more parameter values for the first uplink beam;
receiving, from the base station based at least in part on the report, a control message scheduling the UE to transmit an uplink message within the frequency band; and
transmitting, within the frequency band, the uplink message using the first uplink beam according to the one or more parameter values.

14. The method of claim 13, further comprising:
receiving the report request indicating a plurality of uplink beams; and
transmitting the report indicating respective one or more parameter values for each uplink beam of the plurality of uplink beams.

15. The method of claim 13, further comprising:
receiving the report request message indicating a second frequency band, the report prompting the UE to report one or more second parameter values for the first uplink beam for which the UE is capable of generating, using the one or more parameter values, a main lobe and a grating lobe of the first uplink beam that each satisfy a permissible exposure constraint for the second frequency band;
transmitting, to the base station, the report indicating the one or more second parameter values for the first uplink beam;
receiving, from the base station based at least in part on the report, the control message scheduling the UE to transmit a second uplink message within the second frequency band; and
transmitting, within the second frequency band, the second uplink message using the first uplink beam according to the one or more second parameter values.

16. The method of claim 13, further comprising:
receiving the report request message indicating a second uplink beam, the report prompting the UE to report one or more second parameter values for the second uplink beam for which the UE is capable of generating, using the one or more parameter values, a main lobe and a grating lobe of the second uplink beam that each satisfy a permissible exposure constraint for the frequency band;
transmitting, to the base station, the report indicating the one or more second parameter values for the second uplink beam;
receiving, from the base station based at least in part on the report, the control message scheduling the UE to transmit a second uplink message within the frequency band; and
transmitting, within the frequency band, the second uplink message using the second uplink beam according to the one or more second parameter values.

17. The method of claim 13, wherein receiving the report request message comprises:
receiving the report request message indicating a transmission configuration state of the first uplink beam.

18. The method of claim 13, wherein transmitting the report comprises:
transmitting the report indicating the one or more parameter values comprising a permissible exposure threshold, a permissible exposure timer, an indication of the frequency band, a power backoff value, or any combination thereof, for the first uplink beam.

19. A method for wireless communications at a base station, comprising:
- transmitting, to a user equipment (UE), a report request message prompting the UE to report an uplink beam for a frequency band;
- receiving, from the UE, a report indicating a first uplink beam for which the UE is capable of generating a main lobe and a grating lobe of the first uplink beam that each satisfy a permissible exposure constraint for the frequency band;
- transmitting, to the UE, a control message scheduling the UE to transmit an uplink message within the frequency band; and
- receiving the uplink message within the frequency band using the first uplink beam.

20. The method of claim 19, wherein receiving the report comprises:
- receiving the report indicating the first uplink beam from a set of available uplink beams based at least in part on a magnitude of the grating lobe of the first uplink beam satisfying the permissible exposure constraint in a direction of the grating lobe that is a function of the frequency band.

21. The method of claim 19, wherein receiving the report comprises:
- receiving the report indicating the first uplink beam from a set of available uplink beams based at least in part on a magnitude of the main lobe of the first uplink beam satisfying the permissible exposure constraint in a direction of the first uplink beam.

22. The method of claim 19, further comprising:
- transmitting, to the UE, control signaling configuring the UE to operate in a carrier aggregation mode for a plurality of frequency bands comprising the frequency band; and
- receiving the report indicating one or more uplink beams for which the UE is capable of generating a respective main lobe and a respective grating lobe that each satisfy a permissible exposure constraint in a respective frequency band of the plurality of frequency bands.

23. The method of claim 22, wherein receiving the report comprises:
- receiving the report indicating a second uplink beam for which the UE is capable of generating a second main lobe and a second grating lobe of the second uplink beam that each satisfy a permissible exposure constraint for a second frequency band of the plurality of frequency bands.

24. The method of claim 22, wherein receiving the report comprises:
- receiving the report indicating the first uplink beam for which the UE is capable of generating the main lobe and the grating lobe of the first uplink beam that each satisfy a permissible exposure constraint for a second frequency band.

25. The method of claim 22, wherein receiving the report comprises:
- receiving the report indicating the first uplink beam for which the UE is capable of generating the main lobe and the grating lobe of the first uplink beam that each satisfy a permissible exposure constraint for a subset of the plurality of frequency bands.

26. The method of claim 22, further comprising:
- transmitting, to the UE, control signaling initiating a beam refinement procedure for multiple frequency bands of the plurality of frequency bands for the carrier aggregation mode; and
- receiving the report indicating one or more uplink beams for which the UE is capable of generating a respective main lobe and a respective grating lobe that each satisfy a permissible exposure constraint in a respective frequency band of the multiple frequency bands based at least in part on the control signaling.

27. A method for wireless communications at a base station, comprising:
- transmitting, to a user equipment (UE), a report request message indicating a first uplink beam and a frequency band, the report request message prompting the UE to report one or more parameter values for the first uplink beam for which the UE is capable of generating, using the one or more parameter values, a main lobe and a grating lobe of the first uplink beam that each satisfy a permissible exposure constraint for the frequency band;
- receiving, from the UE, a report indicating the one or more parameter values for the first uplink beam;
- transmitting, to the UE based at least in part on the report, a control message scheduling the UE to transmit an uplink message within the frequency band; and
- receiving, within the frequency band, the uplink message using the first uplink beam according to the one or more parameter values.

28. The method of claim 27, further comprising:
- transmitting the report request indicating a plurality of uplink beams; and
- receiving the report indicating the one or more parameter values for each uplink beam of the plurality of uplink beams.

29. The method of claim 27, further comprising:
- transmitting the report request message indicating a second frequency band, the report prompting the UE to report one or more second parameter values for the first uplink beam for which the UE is capable of generating, using the one or more parameter values, a main lobe and a grating lobe of the first uplink beam that each satisfy a permissible exposure constraint for the second frequency band;
- receiving, from the UE, the report indicating the one or more second parameter values for the first uplink beam;
- transmitting, to the UE based at least in part on the report, the control message scheduling the UE to transmit a second uplink message within the second frequency band; and
- receiving, within the second frequency band, the second uplink message using the first uplink beam according to the one or more second parameter values.

30. The method of claim 27, further comprising:
- transmitting the report request message indicating a second uplink beam, the report prompting the UE to report one or more second parameter values for the second uplink beam for which the UE is capable of generating, using the one or more parameter values, a main lobe and a grating lobe of the second uplink beam that each satisfy a permissible exposure constraint for the frequency band;
- receiving, from the UE, the report indicating the one or more second parameter values for the second uplink beam;
- transmitting, to the UE based at least in part on the report, the control message scheduling the UE to transmit a second uplink message within the frequency band; and
- receiving, within the frequency band, the second uplink message using the second uplink beam according to the one or more second parameter values.

* * * * *